United States Patent
Taylor et al.

(10) Patent No.: US 7,805,220 B2
(45) Date of Patent: Sep. 28, 2010

(54) ROBOT VACUUM WITH INTERNAL MAPPING SYSTEM

(75) Inventors: Charles E. Taylor, Punta Gorda, FL (US); Andrew J. Parker, Novato, CA (US); Shek Fai Lau, Foster City, CA (US); Eric C. Blair, San Rafael, CA (US); Andrew Heninger, Palo Alto, CA (US); Eric Ng, San Leandro, CA (US)

(73) Assignee: Sharper Image Acquisition LLC, New York, NY (US)

( * ) Notice: Subject to any disclaimer, the term of this patent is extended or adjusted under 35 U.S.C. 154(b) by 1120 days.

(21) Appl. No.: 10/798,732

(22) Filed: Mar. 11, 2004

(65) Prior Publication Data

US 2005/0000543 A1 Jan. 6, 2005

Related U.S. Application Data

(60) Provisional application No. 60/454,934, filed on Mar. 14, 2003, provisional application No. 60/518,756, filed on Nov. 10, 2003, provisional application No. 60/518,763, filed on Nov. 10, 2003, provisional application No. 60/526,868, filed on Dec. 4, 2003, provisional application No. 60/527,021, filed on Dec. 4, 2003, provisional application No. 60/526,805, filed on Dec. 4, 2003.

(51) Int. Cl.
*G05B 19/18* (2006.01)
*G06F 19/00* (2006.01)
*G05B 19/04* (2006.01)

(52) U.S. Cl. .................. 700/253; 700/245; 701/23; 701/26; 318/568.12; 318/568.17

(58) Field of Classification Search .............. 701/25, 701/23, 26; 134/18; 700/245, 253; 318/568.12, 318/568.17
See application file for complete search history.

(56) References Cited

U.S. PATENT DOCUMENTS

| | | |
|---|---|---|
| D182,364 S | 3/1958 | Jepson et al. |
| D187,065 S | 1/1960 | Chapman |
| D214,340 S | 6/1969 | Schaefer et al. |
| D233,645 S | 11/1974 | Diehl |
| D233,647 S | 11/1974 | Diehl |
| 4,119,900 A | 10/1978 | Kremnitz |

(Continued)

FOREIGN PATENT DOCUMENTS

DE 100 00 407 A1 7/2001

(Continued)

OTHER PUBLICATIONS

"Roomba" Intelligent Floor Vac, Owners Manual; 2002 iRobot Corporation; Cover page and Contents; pp. 1-18.

(Continued)

*Primary Examiner*—Thomas G Black
*Assistant Examiner*—Christine M Behncke
(74) *Attorney, Agent, or Firm*—Arent Fox LLP

(57) ABSTRACT

A robot cleaner is described that cleans a room using a serpentine room clean and a serpentine localized clean. Sensors can include an object following sensor, a stairway detector and bumper sensors.

20 Claims, 18 Drawing Sheets

SUB GRID MAP

U.S. PATENT DOCUMENTS

| | | | |
|---|---|---|---|
| D251,628 S | 4/1979 | McQuarrie et al. | |
| D251,900 S | 5/1979 | Campbell | |
| D258,821 S | 4/1981 | Wareham et al. | |
| 4,306,329 A | 12/1981 | Vokoi | |
| D262,643 S | 1/1982 | Wong | |
| D287,986 S | 1/1987 | Matsui | |
| 4,638,445 A | 1/1987 | Mattaboni | |
| 4,654,659 A | 3/1987 | Kubo | |
| 4,658,385 A | 4/1987 | Tsuji | |
| 4,674,048 A * | 6/1987 | Okumura | 701/25 |
| 4,700,427 A | 10/1987 | Knepper | |
| 4,706,327 A | 11/1987 | Getz et al. | |
| D293,344 S | 12/1987 | Shiraishi | |
| 4,736,826 A | 4/1988 | White et al. | |
| D297,749 S | 9/1988 | Rodis-Jamero | |
| 4,782,550 A | 11/1988 | Jacobs | |
| 4,962,453 A | 10/1990 | Pong et al. | |
| 4,977,639 A | 12/1990 | Takahashi et al. | |
| 5,012,886 A | 5/1991 | Jonas et al. | |
| 5,023,444 A | 6/1991 | Ohman | |
| 5,032,775 A | 7/1991 | Mizuno et al. | |
| 5,095,577 A | 3/1992 | Jonas et al. | |
| 5,109,566 A | 5/1992 | Kobayashi et al. | |
| 5,111,401 A | 5/1992 | Everett, Jr. et al. | |
| 5,148,573 A | 9/1992 | Killian et al. | |
| 5,208,521 A | 5/1993 | Aoyama | |
| 5,220,263 A | 6/1993 | Onishi et al. | |
| 5,276,618 A | 1/1994 | Everett, Jr. | |
| 5,279,972 A | 1/1994 | Heckenberg et al. | |
| 5,284,522 A | 2/1994 | Kobayashi et al. | |
| 5,293,955 A | 3/1994 | Lee | |
| 5,307,273 A | 4/1994 | Oh et al. | |
| 5,309,592 A | 5/1994 | Hiratsuka | |
| 5,321,614 A | 6/1994 | Ashworth | |
| 5,341,540 A | 8/1994 | Soupert et al. | |
| 5,369,347 A | 11/1994 | Yoo | |
| 5,402,051 A | 3/1995 | Fujiwara et al. | |
| 5,440,216 A | 8/1995 | Kim | |
| 5,446,356 A | 8/1995 | Kim | |
| 5,498,940 A | 3/1996 | Kim et al. | |
| 5,534,762 A | 7/1996 | Kim | |
| 5,554,917 A | 9/1996 | Kurz et al. | |
| 5,568,589 A | 10/1996 | Hwang | |
| D375,592 S | 11/1996 | Ljunggren | |
| 5,613,261 A | 3/1997 | Kawakami et al. | |
| 5,621,291 A | 4/1997 | Lee | |
| 5,622,236 A | 4/1997 | Azumi et al. | |
| 5,634,237 A | 6/1997 | Paranjpe | |
| 5,664,285 A | 9/1997 | Melito et al. | |
| 5,677,836 A * | 10/1997 | Bauer | 701/23 |
| 5,682,640 A | 11/1997 | Han | |
| 5,720,077 A | 2/1998 | Nakamura et al. | |
| 5,729,855 A | 3/1998 | Davis | |
| 5,787,545 A | 8/1998 | Colens | |
| 5,815,880 A | 10/1998 | Nakanishi | |
| 5,841,259 A | 11/1998 | Kim et al. | |
| D407,090 S | 3/1999 | Althans | |
| 5,894,621 A | 4/1999 | Kubo | |
| 5,896,488 A * | 4/1999 | Jeong | 700/255 |
| 5,940,927 A | 8/1999 | Haegermarck et al. | |
| 5,940,930 A | 8/1999 | Oh et al. | |
| 5,942,869 A | 8/1999 | Katou et al. | |
| 5,974,347 A | 10/1999 | Nelson | 701/22 |
| 5,975,090 A | 11/1999 | Taylor et al. | |
| 5,995,883 A | 11/1999 | Nishikado | |
| 5,995,884 A | 11/1999 | Allen et al. | |
| 6,042,656 A | 3/2000 | Knutson | |
| 6,076,025 A | 6/2000 | Ueno et al. | |
| 6,226 A | 6/2000 | Reed | |
| 6,119,057 A | 9/2000 | Kawagoe | |
| 6,124,694 A | 9/2000 | Bancroft et al. | |
| 6,167,332 A * | 12/2000 | Kurtzberg et al. | 701/23 |
| D437,368 S | 2/2001 | Tsai | |
| 6,243,623 B1 | 6/2001 | Takenaka et al. | |
| 6,255,793 B1 | 7/2001 | Peless et al. | |
| 6,263,989 B1 | 7/2001 | Won | |
| 6,266,576 B1 | 7/2001 | Okada et al. | |
| 6,289,265 B1 | 9/2001 | Takenaka et al. | |
| 6,317,652 B1 | 11/2001 | Osada | |
| 6,323,932 B1 | 11/2001 | Zhang et al. | |
| 6,327,741 B1 | 12/2001 | Reed | |
| 6,338,013 B1 | 1/2002 | Ruffner | |
| 6,339,735 B1 | 1/2002 | Peless et al. | |
| D453,753 S | 2/2002 | Ahn | |
| 6,370,453 B2 | 4/2002 | Sommer | |
| 6,389,329 B1 | 5/2002 | Colens | |
| 6,415,203 B1 | 7/2002 | Inoue et al. | |
| 6,417,641 B2 | 7/2002 | Peless et al. | |
| 6,431,296 B1 | 8/2002 | Won | |
| 6,457,206 B1 | 10/2002 | Judson | |
| 6,459,955 B1 | 10/2002 | Bartsch et al. | |
| 6,481,515 B1 | 11/2002 | Kirkpatrick et al. | |
| 6,493,612 B1 | 12/2002 | Bisset et al. | |
| 6,493,613 B2 | 12/2002 | Peless et al. | |
| 6,496,754 B2 | 12/2002 | Song et al. | |
| 6,496,755 B2 | 12/2002 | Wallach et al. | |
| 6,507,773 B2 | 1/2003 | Parker et al. | |
| 6,508,867 B2 | 1/2003 | Schoenewald et al. | |
| 6,519,804 B1 | 2/2003 | Vujik | |
| 6,522,239 B1 | 2/2003 | Peschl | |
| D471,243 S | 3/2003 | Cioffi et al. | |
| 6,532,404 B2 | 3/2003 | Colens | |
| 6,535,793 B2 | 3/2003 | Allard | |
| 6,553,612 B1 | 4/2003 | Dyson et al. | |
| D474,312 S | 5/2003 | Stephens et al. | |
| 6,574,536 B1 | 6/2003 | Kawagoe et al. | |
| 6,586,908 B2 | 7/2003 | Petersson et al. | |
| 6,590,222 B1 | 7/2003 | Bisset et al. | |
| 6,594,551 B2 | 7/2003 | McKinney, Jr. et al. | |
| 6,594,844 B2 | 7/2003 | Jones | |
| 6,597,143 B2 | 7/2003 | Song et al. | |
| 6,601,265 B1 | 8/2003 | Burlington | |
| 6,604,022 B2 | 8/2003 | Parker et al. | |
| 6,605,156 B1 | 8/2003 | Clark et al. | |
| 6,611,120 B2 | 8/2003 | Song et al. | |
| 6,615,108 B1 | 9/2003 | Peless et al. | |
| 6,615,885 B1 | 9/2003 | Ohm | |
| 6,661,239 B1 | 12/2003 | Ozick | |
| 6,671,592 B1 | 12/2003 | Bisset et al. | |
| 6,690,134 B1 | 2/2004 | Jones et al. | |
| 6,732,826 B2 * | 5/2004 | Song et al. | 180/169 |
| 6,775,871 B1 | 8/2004 | Finch | |
| 6,779,217 B2 | 8/2004 | Fisher | |
| 6,809,490 B2 | 10/2004 | Jones et al. | |
| 6,841,963 B2 * | 1/2005 | Song et al. | 318/568.12 |
| 6,938,298 B2 | 9/2005 | Aasen | |
| 7,085,624 B2 * | 8/2006 | Aldred et al. | 700/253 |
| 7,206,677 B2 * | 4/2007 | Hulden | 701/23 |
| 2001/0022506 A1 | 9/2001 | Peless et al. | |
| 2001/0047226 A1 | 11/2001 | Saijo et al. | |
| 2001/0047895 A1 | 12/2001 | DeFazio et al. | |
| 2002/0036617 A1 | 3/2002 | Pryor | |
| 2002/0060542 A1 | 5/2002 | Song et al. | |
| 2002/0063775 A1 | 5/2002 | Taylor | |
| 2002/0091466 A1 | 7/2002 | Song et al. | |
| 2002/0112899 A1 | 8/2002 | Dijksman et al. | |
| 2002/0120364 A1 | 8/2002 | Colens | |
| 2002/0140633 A1 | 10/2002 | Rafii et al. | |
| 2002/0153855 A1 | 10/2002 | Song et al. | |
| 2002/0189871 A1 | 12/2002 | Won | |
| 2002/0193908 A1 | 12/2002 | Parker et al. | |
| 2003/0025472 A1 | 2/2003 | Jones et al. | |
| 2003/0030398 A1 | 2/2003 | Jacobs et al. | |
| 2003/0039171 A1 | 2/2003 | Chiapetta | |

| | | | |
|---|---|---|---|
| 2003/0060928 | A1 | 3/2003 | Abramson et al. |
| 2003/0076484 | A1 | 4/2003 | Bamji et al. |
| 2003/0120389 | A1 | 6/2003 | Abramson et al. |
| 2003/0192144 | A1 | 10/2003 | Song et al. |
| 2003/0208304 | A1 | 11/2003 | Peless et al. |
| 2003/0229421 | A1 | 12/2003 | Chmura et al. |
| 2004/0031113 | A1 | 2/2004 | Wosewick et al. |
| 2004/0046736 | A1 | 3/2004 | Pryor et al. |
| 2004/0117604 | A1 | 6/2004 | Marr et al. |
| 2005/0046373 | A1 * | 3/2005 | Aldred ............... 318/580 |

FOREIGN PATENT DOCUMENTS

| | | |
|---|---|---|
| DE | 100 42 753 C2 | 9/2002 |
| EP | 1 133 537 A1 | 7/2003 |
| GB | 2 344 747 A | 6/2000 |
| GB | 2 344 748 A | 6/2000 |
| GB | 2 352 486 A | 1/2001 |
| GB | 2 355 523 A | 4/2001 |
| GB | 2 369 511 A | 5/2002 |
| JP | 05046246 | 2/1993 |
| JP | 11-178765 | 7/1999 |
| JP | 2001-258806 | 9/2001 |
| JP | 2003 299601 | 10/2002 |
| JP | 2002 360479 | 12/2002 |
| JP | 2003-190064 | 7/2003 |
| WO | WO 00/36968 | 6/2000 |
| WO | WO 00/36970 | 6/2000 |
| WO | WO 00/38255 | 6/2000 |
| WO | WO 00/73867 | 12/2000 |
| WO | WO 00/73868 | 12/2000 |
| WO | WO 01/01208 | 1/2001 |
| WO | WO 01/28400 | 4/2001 |
| WO | WO 02/062194 | 8/2002 |
| WO | WO 02/067744 | 9/2002 |
| WO | WO 02/075469 | 9/2002 |
| WO | WO0275470 * | 9/2002 |
| WO | WO 03/031285 | 4/2003 |
| WO | WO 03/062937 | 7/2003 |
| WO | WO 03/104909 | 12/2003 |

OTHER PUBLICATIONS

Russell et al., "A Modern, Agent-Oriented Approach to Introductory Artificial Intelligence", Sun Microsystems Laboratories; (3 pages).
Ulrich et al., "Autonomous Vacuum Cleaner"; Laboratory of Microcomputing (LAMI); Swiss Federal Institute of Technology; Abstract: pp. 1-16.
Choset et al., "Coverage Path Planning: The Boustrophedon Cellular Decomposition"; Dept. of Mechanical Engineering, Carnegie Mellon University; Nomadic Technologies, Inc.; Abstract; (7 pages).
JACO; Trash Retrieval Robot; University of Florida; Department of Electrical and Computer Engineering; EEL 5666; Intelligent Machine Design Laboratory; Aaron Grassian; Apr. 29, 1997; (15 pages).
Doty et al., "Sweep Strategies for a Sensory-Driven, Behavior-Based Vacuum Cleaning Agent"; Machine Intelligence Laboratory; University of Florida, Gainesville, FL; AAAI 1993 Fall Symposium Series; Instantiating Real-World Agents; Research Triangle Park, Raleigh, NC; Oct. 22-24, 1993; pp. 1-6.
Abstract of Berger; Khosia. Space Station automation IV; Proceedings of the Meeting, Cambridge, MA, Nov. 7-9, 1988. Bellingham, WA, Society of Photo-Optical Instrumentation Engineers, 1988, pp. 163-172.
Abstract of Said; Makino. Proceedings of the Second International Conference on Mechatronics and Machine Vision in Practice, M/supp 2/VIP95; 1995, City Univ. Hong Kong, Hong Kong; pp. 96-101.
Abstract of Mertsching; Schnusenberg; Neusser; Schwederski. Proceedings of IAPR Workshop on Machine Vision Applications, Univ. Tokyo, Japan, 1994, pp. 319-324.
Abstract of Sagues; Guerrero. Conference Proceedings. 1993 International Conference on Systems, Man and Cybernetics. Systems Engineering in the Service of Humans; IEEE; 1993; pp. 511-516.
Abstract of Hildreth. Mechanical Engineering, M.S.K., vol. 104, Aug. 1982, pp. 48-53.
Abstract of Bishay; Peters; Kawamura. Proceedings 1994 IEEE International Conference on Robotics and Automation; IEEE Comput. Soc. Press, Los Alamitos, CA, May 1994. vol. 1. pp. 775-780.
Abstract of Malik; Sinha; Proc. SPIE—Int. Soc. Opt. Eng., SPIE, USA, vol. 1902. 1993. pp. 171-178.
Abstract of Al-Hujazi; Sood. IEEE Transactions on Systems, Man and Cybernetics. USA. Nov.-Dec. 1990. vol. 20, No. 6, pp. 1313-1325.
Abstract of Lee; Catthoor; De Man. Sixth Multidimensional Signal Processing Workshop; New York, NY, USA. 1989. pp. 66-67.
Abstract of Vlassis; Motomura; Hara; Asoh; Matsui. Proceedings 2001 ICRA. IEEE International Conference on Robotics and Automation. IEEE. Piscataway, NJ, USA. 2001. pp. 1579-1584, vol. 2.
Abstract of Roth; Sadykhov; Schilling; Selikhanovich; Vershok. 3rd Eurel Workshop and Masterclass. European Advanced Robotics Systems Development, Univ. Salford. UK. 2000, pp. 5, vol. 2.
Abstract of Miin Tyi Chao; Braunl; Zaknich. ICONIP'99. ANZIIS'99 & ANNES'99 & ACNN'99. 6th International Conference on Neural Information Processing. IEEE. Piscataway, NJ. USA. 1999. pp. 650-655, vol. 2.
Abstract of Llata; Sarabia,;Oria. Intelligent Components for Vehicles (ICV'98). Proceedings volume from the IFAC Workshop. Elsevier Sci. Kidlington, UK. 1998. pp. 287-292.
Abstract of Zheng Xiaosong; Liu Mouzheng. J. Tongji Univ., Nat. Sci. China. Jun. 1999. pp. 337-341.
Abstract of Morsy; Kanayama. Proceedings. 1997 IEEE International Symposium on Computational Intelligence in Robotics and Automation CIRA'97. Towards New Computational Principles for Robotics and Automation. IEEE. Comput. Soc. Press. Los Alamitos, CA. USA. 1997. pp. 398-405.
"Android Design Practical Approaches for Robot Builders" by Martin Bradley Weinstein, Copyright 1981 by Hayden Book Company Inc., pp. 132-133.
Applica/Black & Decker RV500 Zoombot.
Lentek Intelli-Vac, The Lentek Automatic Robotic Floor Vac.

* cited by examiner

FIG. 16B

| | | | SUBGRID | | | PREVIOUS SUBGRIDS | | |

(figure shows an L-shaped grid of cells with values)

FIG. 16A

SUB GRID MAP

ROBOT VACUUM WITH INTERNAL MAPPING SYSTEM

CLAIM OF PRIORITY

This application claims priority to U.S. Patent Provisional Application No. 60/454,934 filed Mar. 14, 2003; U.S. Provisional Application No. 60/518,756 filed Nov. 10, 2003; U.S. Provisional Application No. 60/518,763 filed Nov. 10, 2003; U.S. Provisional Application No. 60/526,868 filed Dec. 4, 2003; U.S. Provisional Application No. 60/527,021 filed Dec. 4, 2003 and U.S. Provisional Application No. 60/526,805 filed Dec. 4, 2003.

CROSS REFERENCES TO RELATED APPLICATIONS

This application is related to the following commonly-owned patent applications: "ROBOTIC VACUUM CLEANER WITH EDGE AND OBJECT DETECTION SYSTEM", Ser. No. 10/799,573; "ROBOTIC VACUUM CLEANER WITH POSITIONABLE NAVIGATIONAL MARKERS," Ser. No. 11/104,890; "ROBOT VACUUM CLEANER," Ser. No. 11/171,031.

FIELD OF THE INVENTION

The present invention relates generally to robotic cleaners.

BACKGROUND

Robot cleaners, such as robot vacuums, have been proposed to clean rooms. One issue in producing a robot cleaner is the problem of controlling the robot cleaner to clean an entire room without missing regions. This problem relates to the difficulty of accurately positioning a robot cleaner.

One robot vacuum is the Roomba™ vacuum from iRobot. The Roomba™ vacuum avoids the positioning problem by making multiple passes through a room in a somewhat random fashion. The Roomba™ vacuum starts in a spiral pattern until it contacts a wall, follows the wall for a period of time and then crisscrosses the room in straight lines. After it covers the room multiple times, the Roomba™ stops and turns itself off.

BRIEF DESCRIPTION OF THE DRAWINGS

FIG. 16A is a diagram that illustrates a subgrid map for a robot cleaner of one embodiment of the present invention.

FIG. 16B is a diagram illustrating a room map for robot cleaner of one embodiment of the present invention.

DETAILED DESCRIPTION

Figure 1A:
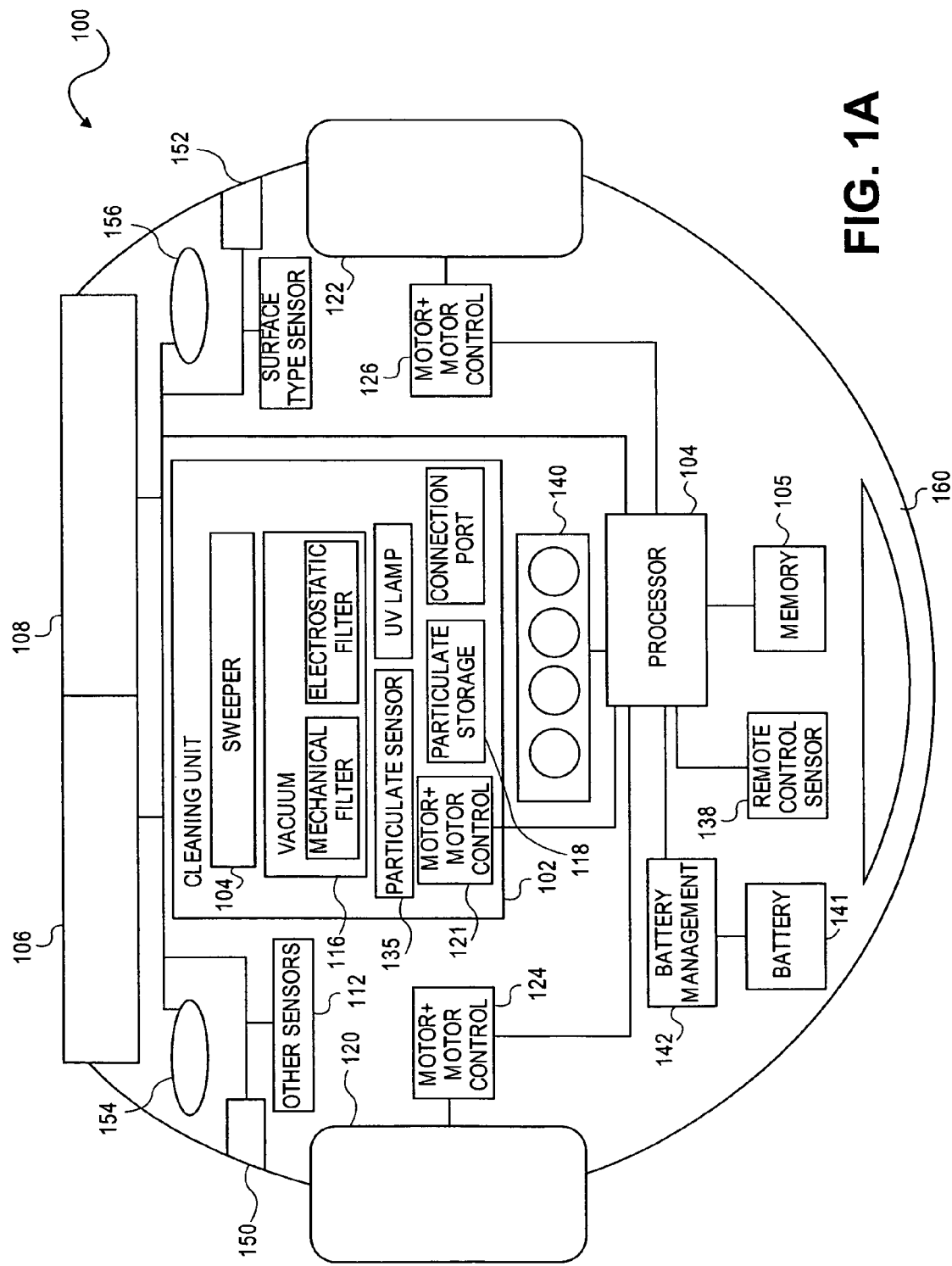
FIG. 1A is a functional diagram of one embodiment of a robot cleaner of the present invention.

FIG. 1A is a functional diagram of a robot cleaner 100 of an exemplary embodiment of the present invention. In this example, the robot cleaner 100 includes a cleaning unit 102 which can be any type of cleaning unit. The cleaning unit can clean any object, such as a carpeted or uncarpeted floor. One cleaning unit comprises a vacuum, with or without a sweeper. Alternately, the cleaning unit can comprise a sweeper, duster or any other type of cleaning unit.

The robot cleaner 100 includes a processor 104 for receiving information from sensors and producing control commands for the robot cleaner 100. For the purposes of this application, the term "processor" includes one or more processor. Any type of processor can be used. The processor 104 is associated with a memory 105 which can store program code, internal maps and other state data for the robot cleaner 100. The processor 104, in one embodiment, is mounted to a circuit board that connects the processor 104 to wires for the sensors, power and motor controllers.

One embodiment of the present invention is a robot cleaner 100 that includes a germicidal ultraviolet lamp 166. The germicidal ultraviolet lamp can emit radiation when it is energized. The UV lamp 166 can be part of or separate from the cleaning unit 102. The germicidal lamp 166 can be a UV-C lamp that preferable emits radiation having wavelength of 254 nanometers. This wavelength is effective in diminishing or destroying bacteria, common germs and viruses to which the lamp light is exposed. Germicidal UV lamps 166 are commercially available. The germicidal lamp is not limited to UV lamps having wavelength of 245 nanometers. Other UV lamps with germicidal properties could also be used.

In one embodiment, the germicidal ultraviolet lamp is positioned to radiate in the internal cavity of the robot cleaner. For example, the cavity can be within an airflow of the cleaning unit such that the germicidal ultraviolet lamp can have germicidal action on the air exhausted by the robot cleaner.

In one embodiment, the germicidal ultraviolet lamp is positioned to irradiate the floor. In this embodiment, the germicidal action can occur upon the floor region such as a carpet or a hard floor. When the germicidal ultraviolet lamp is positioned to irradiate the ground, the power to the UV light can be selected so that it will not damage the floor or carpet. The UV lamp can be inhibited form operation when the robot cleaner is not moving or stuck to prevent damage to the floor or carpet.

In one embodiment as described below, the cleaning unit 102 includes an electrostatic filter 162. The germicidal ultraviolet lamp 166 can be positioned to irradiate an airflow before the electrostatic filter. A mechanical filter 164 can also be used. The mechanical filter can be a vacuum cleaner bag. In one embodiment, the robot cleaner is configured to preclude human viewing of UV light emitted directly from the germicidal ultraviolet lamp. When the germicidal ultraviolet lamp is directed towards the floor, the lamp can be placed in a recessed cavity so that the lamp light does not leak out the side of the robot cleaner, but goes directly towards the floor surface. A protective covering for the lamp can be used in this embodiment to prevent the lamp from contacting a thick rug or other raised surface.

Portions of the robot cleaner irradiated by the germicidal ultraviolet lamp, such as the internal cavity, can be made of a UV resistant material. The UV resistant material can be UV resistant plastic material, such as CYCOLAC® ABS resin, material designation VW300(F2), which is manufactured by General Electric Plastics Global Products, and is certified by UL Inc., for use with ultraviolet light.

The vacuum 116 of this example includes an inlet (not shown). A fan (not shown) can be placed before or after the mechanical filter 164. In one embodiment, the mechanical filter 164 is a vacuum cleaner bag, which provides for particulate storage 118. The vacuum cleaner 100 can also includes an electrostatic filter (electrostatic precipitator) 162 to filter additional particulate from an airflow. The airflow goes out the outlet (not shown). In one embodiment, the electrostatic filter includes an emitter which creates ions and a collector which attracts particulate matter.

Particulate exhausted by a vacuum cleaner can float around within a room and increase the particulate level in the ambient air. The electrostatic filter removes some of this additional particulate and can effectively help keep the air clean while the vacuum cleaner operates.

A variety of different electrostatic filter designs can be used. These designs include cylindrical collector designs, square collector designs, pin grid arrays, pin ring arrays, wire grid arrays and the like. A driver can be used to direct the particulate matter to the collector. The driver can be insulated.

In one embodiment, the collector is a cylinder and the emitter is a wire. The use of the wire increases the ion production from the emitter. A driver can be used to help direct the particulate matter to the collector.

The electrostatic filter can be attached to a high voltage generator (not shown), such as a high voltage pulse generator, coupled between the emitter and the collector of the electrostatic filter 162. The high voltage generator can receive low voltage input from a wall socket or battery 141 to produce a high voltage between the emitter and the collector. High voltage pulses with a number of different possible duty cycles can be used. In one embodiment, a positive output of the high voltage generator is attached to the emitter and a negative output is attached to the collector. The opposite polarity can also be used. When voltage from a high voltage generator is coupled across the emitter and the collector, it is believed that a plasma like field is created surrounding the emitter. This electric field ionizes the ambient air between the edmitter and collector. Particulate entrained in the airflow can become electrostaticly attached to the surface of the collector. The electrostatic filter 162 and high voltage generator can be designed to produce negative ions for the room and desirable concentrations of ozone. The collector of the electrostatic filter can be removable to allow cleaning of the particulate material off of the collector.

The electrostatic filter should be positioned in a region where the airflow in units of distance per time is not so excessive so as to prevent particulate from collecting on the collector or allow the particulate to be swept off the collector. In one embodiment, the airflow is preferably below 500 feet per minute in the region of the electrostatic filter. In one embodiment, the airflow in the electrostatic filter region is 400 ft/min or less. In one embodiment, the cross-section of electrostatic filter region is greater than the cross-section of the inlet to reduce the distance per time airflow rate. In the FIG. 3 example, a 1.25 inch diameter tube may have a distance per time flow rate of 6000 feet per minute, setting the diameter of the electrostatic filter region to a 4.8 inch diameter reduces the distance per time airflow to 400 feet per minute, which is acceptable for the operation of the electrostatic filter.

In one embodiment, the reduction of the distance per time airflow rate is by a factor of 5 or more. In another embodiment, the reduction of the distance per time airflow rate is by a factor of 10 or more.

Figure 1B:
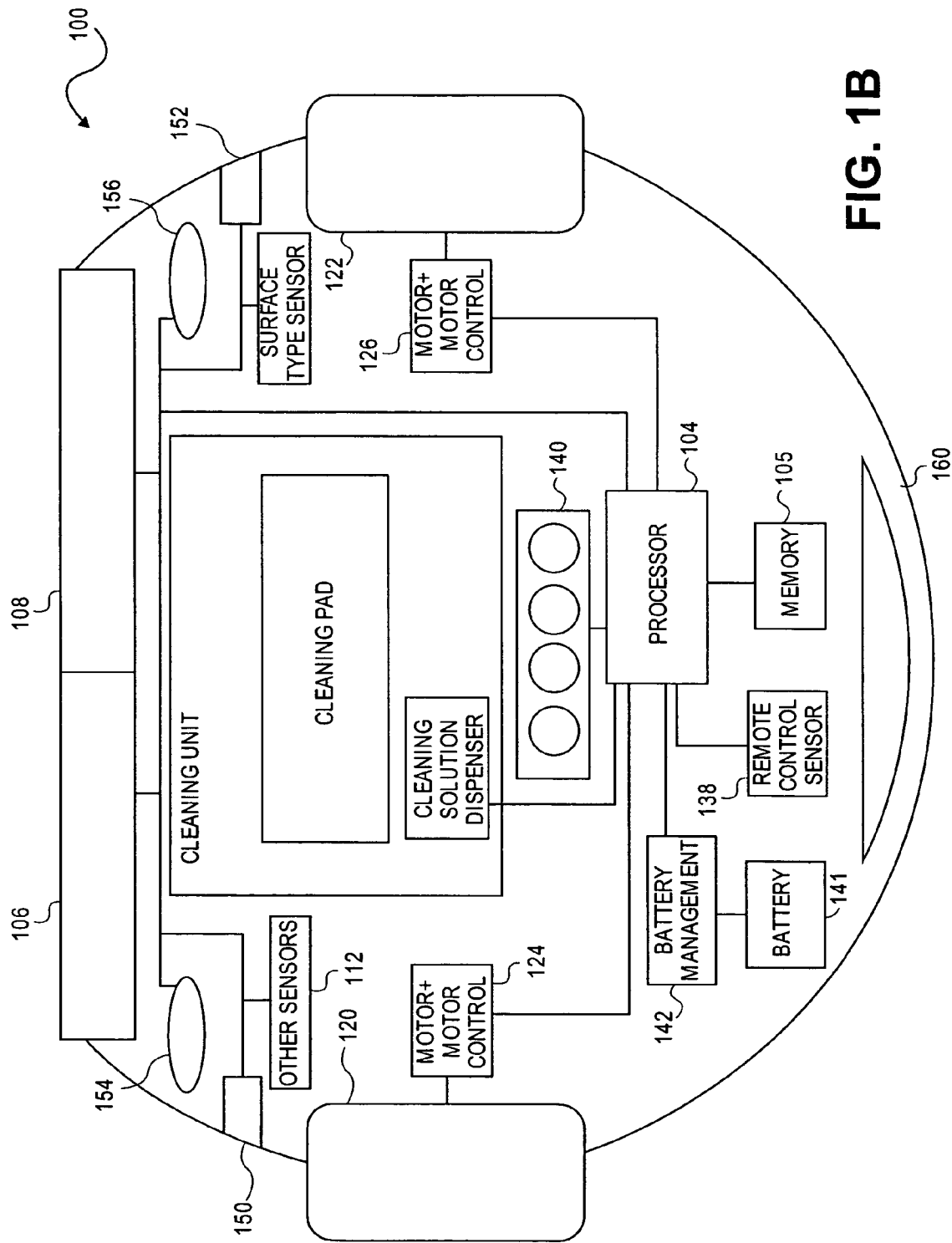
FIG. 1B is a functional diagram of a robot cleaner of an alternate embodiment of the present invention.

One embodiment of the present invention is a robot cleaner that uses a cleaning unit including a cleaning pad. This embodiment is shown in FIG. 1B. The cleaning unit 102 of this example includes a cleaning pad 170. The cleaning pad 170 can be held in place such that when the robot cleaner 100 operates the cleaning pad 170 contacts the floor surface. The cleaning pad can be a sheet of cleaning material. In one embodiment, the cleaning pad is a cloth material which uses static electricity to attract dust. Alternately, the cleaning pad is an absorbent material which absorbs water or a cleaning solution. The cleaning material can be replacable by the user. The robot cleaner can indicate when to replace the claning material based on cleaning time of sensors.

In one embodiment, the cleaning unit 102 also includes a cleaning solution dispenser 172. The cleaning unit dispenser 172 can be used to squirt a cleaning solution onto the floor in the path of the robot cleaner in front of the cleaning pad 170. The robot cleaner can then wipe the floor with the cleaning pad which contains the cleaning solutions provided by the cleaning solution dispenser 172. In one embodiment, the processor 104 can be used to determine when to dispense the cleaning solution. A sensor such as a surface type sensor 174 can be used to determine whether the floor is a hard surface, such as a hardwood floor or linoleum or a soft surface such as a carpet. The surface type sensor 174 can be an optical detector, ultrasound detector or a mechanical detector. In one embodiment, the cleaning solution dispensing 172 is controlled by the user manually or by using a remote control signal to the robot cleaner 100 to dispense the cleaning solution.

In one example, when an internal map is used, the cleaning solution can be dispensed in regions away from obstacles and walls.

The cleaning pad can be on an actuator that moves the pad down to contact a hard floor surface and up for a soft surface such as a carpet. The cleaning pad can be in addition to or in place of vacuum and/or sweeping. The cleaning unit can be modular unit that allows the replacement of a cleaning pad unit with a vacuum and sweeping unit.

The robot sensors 112 can include a camera. In one embodiment, the robot vacuum uses computer vision type image recognition. The camera can use a detector which producers a two dimensional array of image information. The camera can be a visible light camera, a thermal camera, an ultraviolet light camera, laser range finder, synthetic aperture radar or any other type of camera. Information from the camera can be processed using an image recognition system. Such a system can include algorithms for filtering out noise, compensating for illumination problems, enhancing images, defining lines, matching lines to models, extracting shapes and building 3D representation.

One example of a camera for use with the Robot Cleaner is a charge coupled device (CCD) camera to detect visible light. A video camera, such as a camcorder, is arranged so that light falls on an array of metal oxide silicon (MOS) capacitors. Typically, the output of the video signal is an analog signal that is digitized for use by a computer processor. A computer card framegrabber can be used to take analog camera signals and produce a digitized output. Framegrabbers can produce gray scale or color digital images.

An example of a gray scale image uses an 8 bit number to store 256 discreet values of gray. Color can be represented using indications of the color components. For example, by using a red, green, blue (RGB) representation. The cameras can be used to produce orientation information for the robot computer as well as to create a map of the room.

Imaging technology can be used to identify a region in an image with a particular color. On way to do this is to identify all pixels in an image which have a certain color. Pixels which share the same color can be group together. This can be used to identify an objects such as a recharge base, which has a specific color.

One use of vision for the robot cleaner can be to determine range information. The range information can be obtained by using two or more cameras. A stereo camera pair can be centered on the same point in an image. The angles of the two cameras can give range information.

In one embodiment, a light striper is used. Light stripers project lines, stripes, grids or a pattern of dots on an environment and then a vision camera observes how a pattern is distorted on an image. Vision algorithms can scan the rows on the image to see whether the projected lines or dot array is continuous. The location of breaks of the line or the array of dots gives information about the size of an obstacle. Relative placement of the lines or array indicate whether the obstacles are above ground or below ground. For example, such a system can be used to determine a descending stairway which should be avoided by the robot cleaner.

In one embodiment, the software used for the robot cleaner can include a software module for vision. The vision software module can interact with other modules such as those for optical avoidance and behavior. In one embodiment, the robotic vacuum uses navigation functionality such as the ERSP navigation tool available from Evolution Robotics. The ERSP navigation tool controls visual location mapping, path planning, obstacle and cliff avoidance exploration and occupancy grid functionality. The localization and mapping system uses images and other sensors to do visual localization as well as to construct a map that includes landmarks generated by the robot as it explores an environment. The localization and mapping compensates for the changes in lighting moving people and moving objects. The robot uses an existing map of an area or creates a map by determining landmarks in a camera image. When the robot cleaner moves from a known location, the robot cleaner can re-orient itself using the landmarks. Path planing modules can use the map with the landmarks to orient the robot within a path. The landmark map can be used to produce a map of clean or unclean regions within a room. The clean/unclean region map can be separate from or integrated with the landmark map. The robot can use the clean/unclean region map to clean the room.

Any number of sensors can be used with the robot. The sensors can include dead reckoning sensors such as odometry sensors, potentiometers, synchros and resolvers, optical encoders and the like. Doppler or internal navigation sensors can also be used. The robot cleaner can also use internal position error correction.

The sensors can also use tactical and proximity sensors including tactile feelers, tactile bumpers, distributed surface arrays. Proximity sensors such as magnetic proximity sensors, inductive proximity sensors, capacitive proximity sensors, ultrasonic proximity sensors, microwave proximity sensors and optical proximity sensors can also be used.

Sensors can include triangulation ranging sensors such as a stereo disparity sensors and active triangulation units. The sensors can include the time of flight (TOF) sensors such as ultrasonic TOF systems and laser-based TOF sensors. The sensors can include phase-shift measurement and frequency modulation sensors. The sensors can include other ranging techniques such as interferometry range from focus, and return signal intensity sensors. The sensors can also include acoustical energy sensors and electromagnetic energy sensors.

The sensors can include collision avoidance sensors that use navigational control strategies such as reactive control, representational world modeling and combined approach. The sensors can also use navigational re-referencing.

The sensors can include guidepath following sensors such as wire guided and optical stripe senors. The sensors can include a magnetic compass. The sensors can also include gyroscopes including mechanical gyroscopes and optical gyroscopes. The sensors can include RF position-location systems including ground based and satelite bases systems.

The sensors can include ultrasonic and optical position-location sensors. Sensors can include wall, doorway, and ceiling reference sensors.

The sensors can include acoustical sensors, vibration sensors, ultrasonic presence sensors, optical motion detection, passive infrared motion detection, microwave motion detection, video motion detection, intrusion detection on the move and verification and assessment.

In one example, the robot cleaner uses a sensor that produces multiple indications of the distances to an object. An example of such a sensor is an infrared sensor available from Canesta, Inc. of San Jose, Calif. Details of such infrared sensors are described in the U.S. Pat. No. 6,323,932 and published patent applications US 2002/0140633 A1, US 2002/0063775 A1, US 2003/0076484 A1 each of which are incorporated herein by reference.

In one embodiment of the present invention is a robot that includes a sensor producing multiple indications of distances to the closest object in an associated portion of the environment. The processor receives indications from the sensor, determines a feature in the environment and controls a motion unit of the robot to avoid the feature.

The sensor indications can be produced by measuring a period of time to receive a reflected pulse. Alternately, the indications can be produced by measuring an energy of a reflected pulse up to a cutoff time. A determined feature can be indicated in an internal map of the robot. The determined feature can be a step, an object in a room, or other element. The robot can be a robot cleaner.

In one example, an infrared sensor includes an infrared light source to produce pulses of infrared light, optics to focus reflections from the infrared light pulses from different portions of the environment of the robot to different detectors in a 2D array of detectors. The detectors can produce indications of distances to the closest object in an associated portion of the environment.

The optics can include a single or multiple optical elements. In one embodiment, the optics focus light reflected from different regions of the environment to detectors in a 2D array. The detectors produce indications of the distances to the closest objects in associated portions of the environment. The 2D array can includes pixel detectors and associated detector logic. In one embodiment, the 2D array of detectors is constructed of CMOS technology on a semiconductor substrate. The pixel detectors can be photodiodes. The detector logic can include counters. In one embodiment, a counter for a pixel detector runs until a reflected pulse is received. The counter value thus indicates the time for the pulse to be sent from the IR sensor and reflected back from an object in the environment to the pixel detector. Different portions of environment with different objects will have different pulse transit times.

In one embodiment, each detector produces an indication of the distance to the closest object in the associated portion of the environment. Such indications can be sent from the 2D detector array to a memory such as a Frame Buffer RAM that stores frames of the indications. A frame can contain distance indication data of the pixel detectors for a single pulse. A controller can be used to initiate the operation of the IR pulse source as well as to control the counters in the 2D detector array.

The processor in one embodiment is adapted to receive the indications from the IR sensor. In one embodiment, the indications are stored in the frame buffer Random Access Memory (RAM). The indications are used by the processor to determine a feature in the environment and to control the motion of the unit to avoid the feature. Examples of features include steps, walls and objects such as a chair legs. The advantage of the above described IR sensor with a two-dimensional array of detectors is that a full frame of distance indications can be created. Full frames of distance indications simplify feature detection. The burden on the processor is also reduced. In one embodiment, feature detection software receives frames of indications and uses the frames to detect features. Once the features are determined, the features can be added to an internal environment map with feature mapping software. The motion control software can be used to track the position of the robot. Alternately, other elements can be used for positioning the robot. In one embodiment, the robot uses the indications from the detector to determine how to move the robot so that the robot avoids falling down stairs, and bumping into walls and other objects.

In one embodiment, the robot cleaner shuts down when the vacuum becomes tangled in its own cord. Sensors can be located at the sweeper, wheels or cord payout. When the sensor detects an entanglement, signals can be sent to the processor to cause the robot cleaner to shut down.

The robot cleaners can be powered by batteries or power cords. When a power cord is used, the cord can be connected to a wall socket or a unit, such as a central unit connected to a wall socket. The robot cleaner can manuever to avoid the power cord. A payout can be used to keep the power cord tight. In one embodiment, the robot cleaner keeps the cord on one or the other side of the robot cleaner.

In one embodiment, a robot system includes a robot cleaner including a cleaning unit, and a motion unit, and a unit connected to the robot cleaner by an electrical cord to provide power to the robot cleaner. The robot cleaner can clean the room while connected to the unit and the power cord is wound in as the robot cleaner gets closer to the unit. The unit can be a central unit, wherein the robot cleaner moves around the central unit to clean the room. The unit can be connected to a power socket by another power cord. A payout can be located at the robot cleaner or the unit. The robot cleaner can prevent the power cord from completely wrapping around an object on the floor. The robot cleaner can keep track of its motion to determine motion changes caused by the power cord contacting objects on the floor. The robot cleaner can clean back and forth in region behind the object.

A number of different types of batteries can be used. The batteries can include lithium ion (Li-ion), NiNH, NiCd batteries, and fuel cell batteries. Fuel cell batteries extract energy from hydrogen. When the hydrogen is joined to oxygen forming water energy, is produced. The energy takes the form of electricity and some waste heat. The hydrogen can be obtained from a compound, such as methanol. Fuel cell batteries can provide relatively high energy supply which will be used for powering the vacuum fans and the like on a robot vacuum.

Figure 8A:
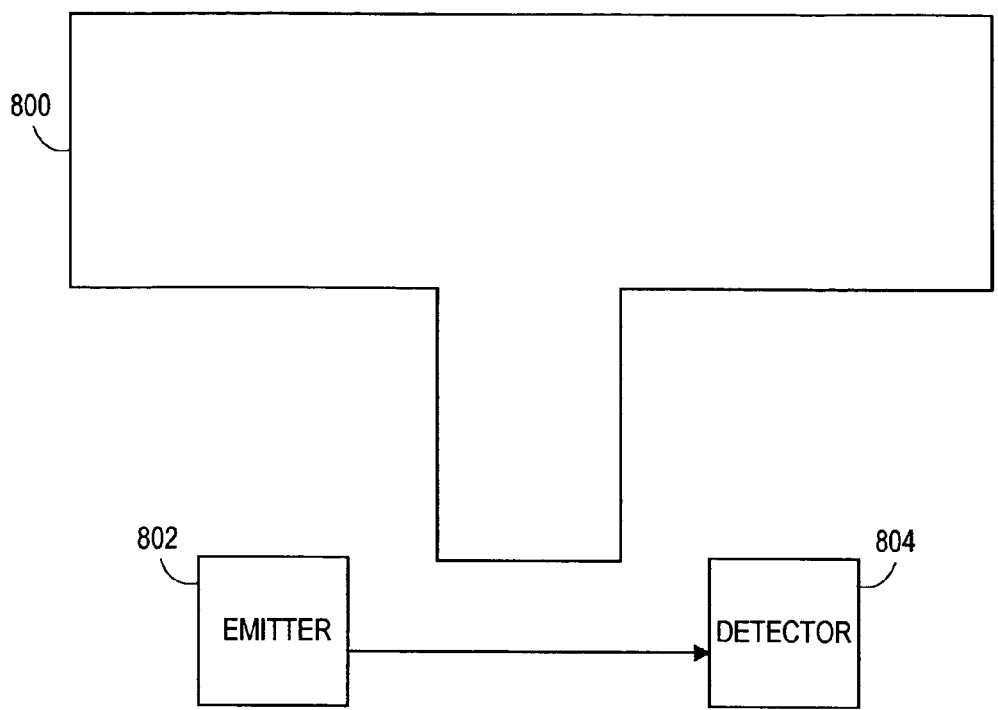
FIGS. 8A and 8B illustrate the operation of a bumper sensor of one embodiment of the present invention.
Figure 8B:
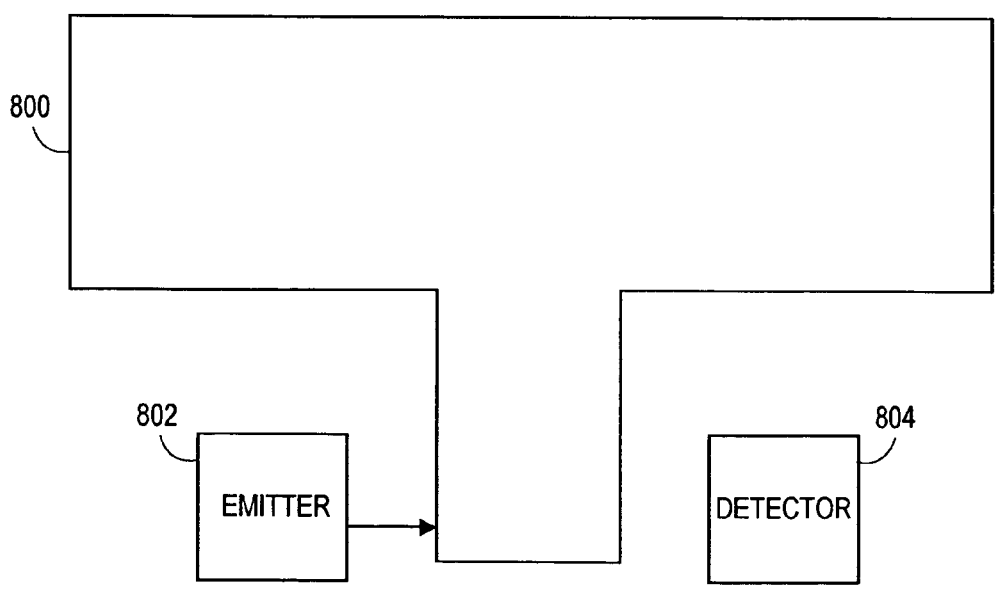

In the example of FIG. 1A, sensors for the robot cleaner 100 include front bumper sensors 106 and 108. In one embodiment, as illustrated in FIGS. 8A and 8B the front sensors use an optical emitter and detector rather than a mechanical switch. The use of more than one front bumper sensor allows the robot cleaner 100 to differentiate between different types of obstacles that the robot encounters. For example, the triggering of a single front sensor may indicate that the robot cleaner 100 has run into a small obstacle which can be maneuvered around. When both front sensors indicate an obstacle, the robot cleaner 100 may have run into a wall or other large obstacle. In one embodiment, the robot cleaner 100 may begin an object following mode after contacting the wall.

In one embodiment, the cleaning unit 102 includes a sweeper 114 that sweeps up dirt and other particulate off of a carpeted or uncarpeted floor. The vacuum 116 can use a fan to draw up dirt and other particulate up to particulate storage 118. The cleaning unit 102 can also include a motor or motors 120 for the sweeper 114 and for the fan used with the vacuum 116.

One embodiment of the present invention includes radiating electromagnetic energy from an emitter and detecting electromagnetic energy with a detector. An element, normally in a first position, is movable to a second position by contact with an object. When the element is in the first position, the detector detects electromagnetic energy from the emitter. When the element is in the second position the detector detects less electromagnetic energy from the detector such that the contact condition can be determined. The operation of the robot is modified in response to the contact condition.

FIGS. 8A and 8B illustrate an example of such a sensor. In FIG. 8A, the element 800 is biased in a first position where energy from the emitter 802 reaches the detector 804. In FIG. 8B, after contact with an object, the element 800 is moved to a second position where energy from the emitter 802 is blocked from reaching the detector 804. The element 800 can be a bumper sensor, such as bumper sensors 106 and 108 of the robot cleaner of FIG. 2. The element 800 can be biased in the first position by a spring (not shown).

Figure 4:
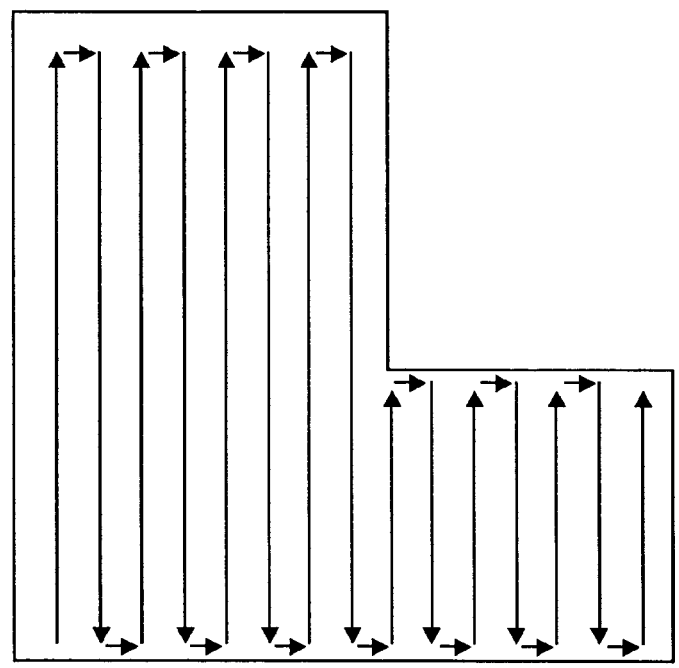
FIG. 4 is a diagram that illustrates a serpentine room clean of one embodiment of the present invention.

FIG. 4 illustrates a serpentine room clean. In this mode, the robot cleaner cleans the length of the room with north/south cleaning segments up to the walls. Incremental right (or left) cleaning segments can be done so that the next north/south segment touches or overlaps the last north/south cleaning segment. The width of the cleaning area produced by the cleaning unit of the robot cleaner is related to the level of overlap. Serpentine cleans reduce the requirement to maintain an internal map.

The serpentine clean can be done with sharp transitions between horizontal and vertical segments by stoping the robot cleaner at the end of a segment and rotating the robot cleaner to the direction of the next segment. Alternately, the serpentine clean can have curved angles by turning the robot cleaner while the robot cleaner is still moving for a gradual transition from one segment to the next.

One embodiment of the present invention comprises cleaning a room in a serpentine pattern. Once an obstacle is detected in the room, an object following mode is entered to avoid the obstacle. After the object is avoided, the robot cleaner resumes the serpentine room clean.

Figure 5:
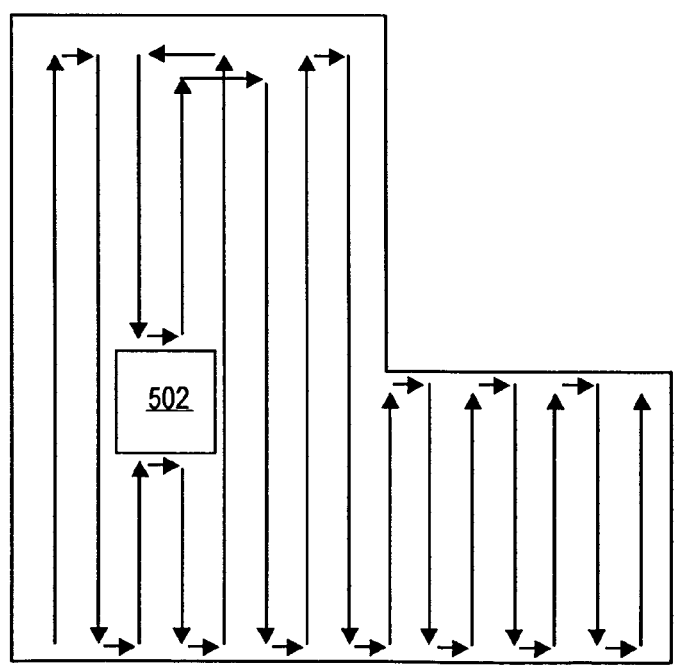
FIG. 5 is a diagram that illustrates an object following mode of one embodiment of the present invention.

FIG. 5 illustrates an example in which a serpentine room clean is interrupted by the detection of an obstacle 502, such as a piece of furniture in the middle of the room or a wall. An object following mode is entered to avoid the obstacle. The object following mode can attempt to keep the robot cleaner a fixed distance from the object. In the example of FIG. 5, the robot cleaner cleans on one side of the obstacle 502 and then cleans on the other side of the obstacle 502.

The robot cleaner can keep track of the cleaned areas of a room by storing a map of the cleaned areas. The map can be created by keeping track of the robot cleaner's position.

Figure 6:
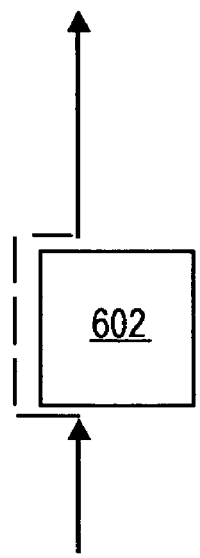
FIG. 6 is a diagram that illustrates an object following mode of another embodiment of the present invention.

FIG. 6 shows a case where the robot cleaner follows the object 602 until the robot cleaner can continue a path segment of the serpentine clean on the other side of the object 602. The robot cleaner can use the object following mode to get to the other side of the obstacle.

The object following sensors 150 and 152 of FIG. 1 can be sonar, infrared or another type of sensor. Processor 104 can control the robot cleaner to clean the room in a serpentine pattern, go into an object following mode to avoid an obstacle detected by the sensor unit, and cause the robot cleaner to resume the serpentine pattern clean once the obstacle is avoided.

Object following can use a sensor, such as a Sonar or IR sensor to follow along the side of an object. The signal from the sensor will typically be smaller the further the robot cleaner is from the object. The sensor signal can be used as feedback in a control algorithm to ensure that the robot cleaner keeps a fixed distance from the wall. In one embodiment, the object following sensors are on multiple sides of the robot cleaner. Sensors in the front of the robot cleaner can be used to avoid collisions. Sensors of the side of the robot cleaner can be used to produce a feedback signal while the robot cleaner is moving parallel to the object.

One embodiment of the present invention comprises selecting a cleaning mode, the cleaning modes include a room cleaning mode and a spot or localized cleaning mode. The localized cleaning mode includes doing a serpentine clean within a predefined region. The robot cleaner then cleans in the selected mode.

Figure 7:
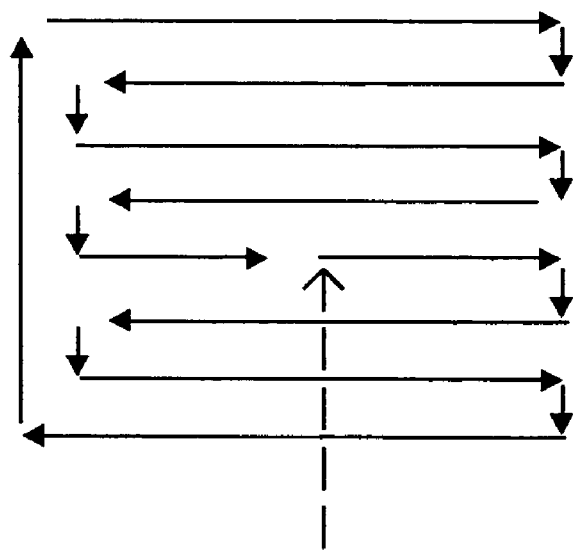
FIG. 7 is a diagram that illustrates a serpentine localized clean of one embodiment of the present invention.

FIG. 7 shows an example of a localized clean. In the example of FIG. 7, the cleaning starts from the center of the localized clean region. In an alternate embodiment, the robot cleaner moves to a corner to start the localized clean. The localized cleaning region can be rectangular, square or any other shape. The room cleaning mode can be a serpentine clean over the entire room and can include object following.

The room cleaning mode can be selected by a button on the input 140 of FIG. 1 or by using a remote control. In one embodiment, a particulate detector on the robot cleaner can be used to determine when to switch to a localized cleaning mode. In one embodiment, the processor 104 can be used to control the robot cleaner in the selected cleaning mode.

In one embodiment, a room is cleaned in a serpentine pattern. A descending stairway is detected with an edge sensor. The edge sensor unit includes an emitter and a detector. The detector detects less reflected energy when the sensor is positioned over the descending stairway. The descending stairway is avoided and the serpentine pattern clean continued.

Figure 10A:
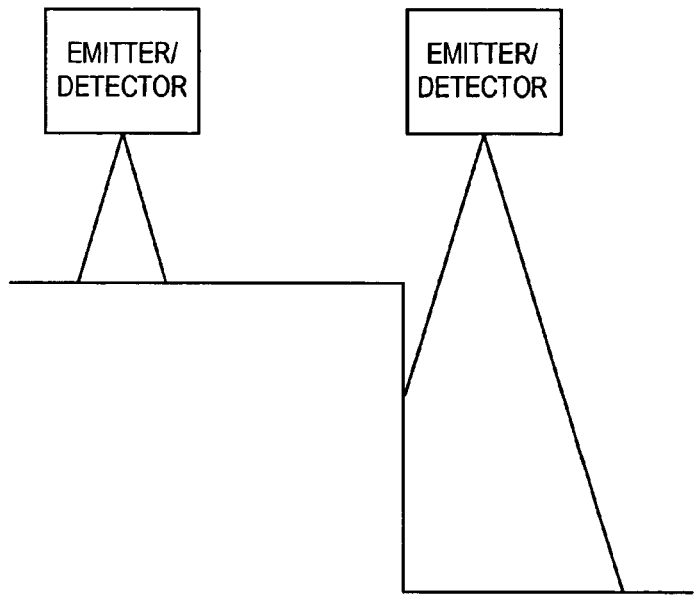
FIGS. 10A and 10B illustrate and edge detector units of one embodiment of the present invention.
Figure 10B:
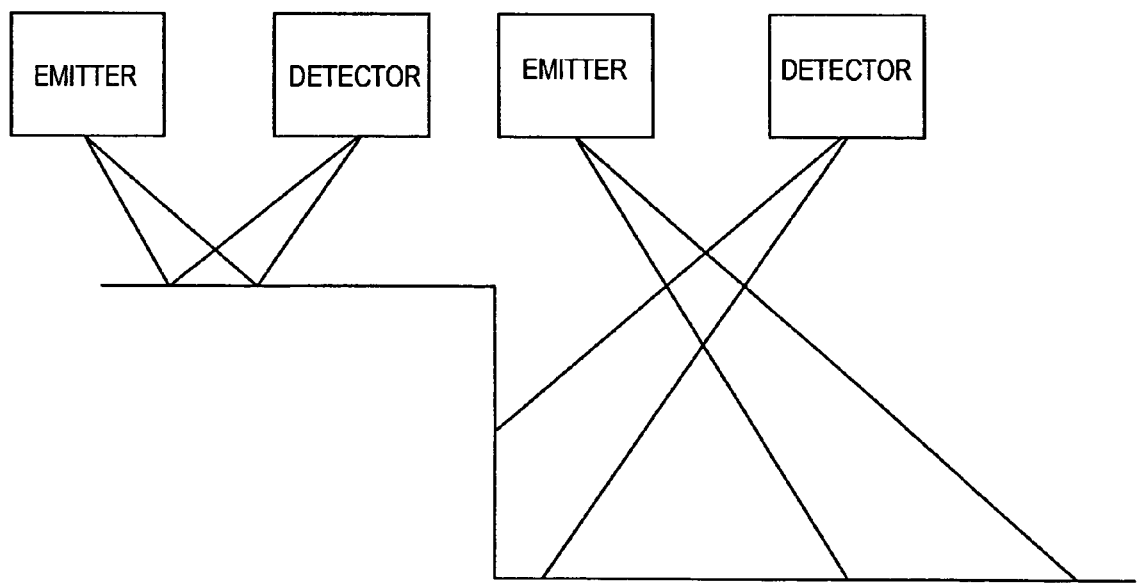

FIGS. 10A and 10B illustrate edge detectors for descending stairways. FIG. 10A shows a diffuse sensors over a floor and over a descending stairway. FIG. 10B shows convergent mode sensors over a floor and over a descending stairway. In a convergent mode sensor, only energy reflected from a finite intersection region will be detected. The finite intersection region can be positioned at the floor (focused on the floor). When the convergent mode sensor is over the descending stairway, substantially no reflected energy is detected.

As shown in FIG. 1, the edge sensors 154 and 156 can be positioned at the periphery of the robot cleaner. The edge sensors can be infrared or other types of sensors. In one embodiment, processor 104 can control the robot cleaner to clean the room in a serpentine pattern; cause the robot cleaner to avoid a detected descending stairway, and cause the robot cleaner to resume the serpentine pattern clean once the descending stairway is avoided.

One embodiment of the present invention includes selecting a floor type mode. The floor type modes including a hard surface mode and a soft surface mode. Operation in the soft surface mode includes rotating a sweeper, such as sweeper 104 of FIG. 1, more than in the hard surface mode. The robot cleaner cleans in the selected floor type mode. The hard surface mode avoids excessive noise that can be associated with a sweeper contacting a wood or other hard surface.

In the hard surface mode, the sweeper can be off or operate at a reduced speed. The soft surface mode can be a carpet cleaning mode. The selection of the floor type mode can be done by pressing a button on the robot cleaner or on a remote control. Alternately, a floor sensor such as a vibration sensor, a mechanical sensor, or an optical sensor, can be used to select between the floor type modes. Processor 104 can be used to control the robot cleaner in the selected floor type mode.

One embodiment of the present invention uses a robot cleaner to clean a room. The robot cleaner can clean under its own control. A supplemental cleaning element is attached to the robot cleaner. The attachment of the supplemental cleaning element can pause the robot cleaner or the robot cleaner can be paused by pressing a button on the robot cleaner or a remote control. The robot cleaner can be carried and the supplemental cleaning element used to clean to clean an object. In this way, the robot cleaner can be used as a portable vacuum.

Figure 9A:
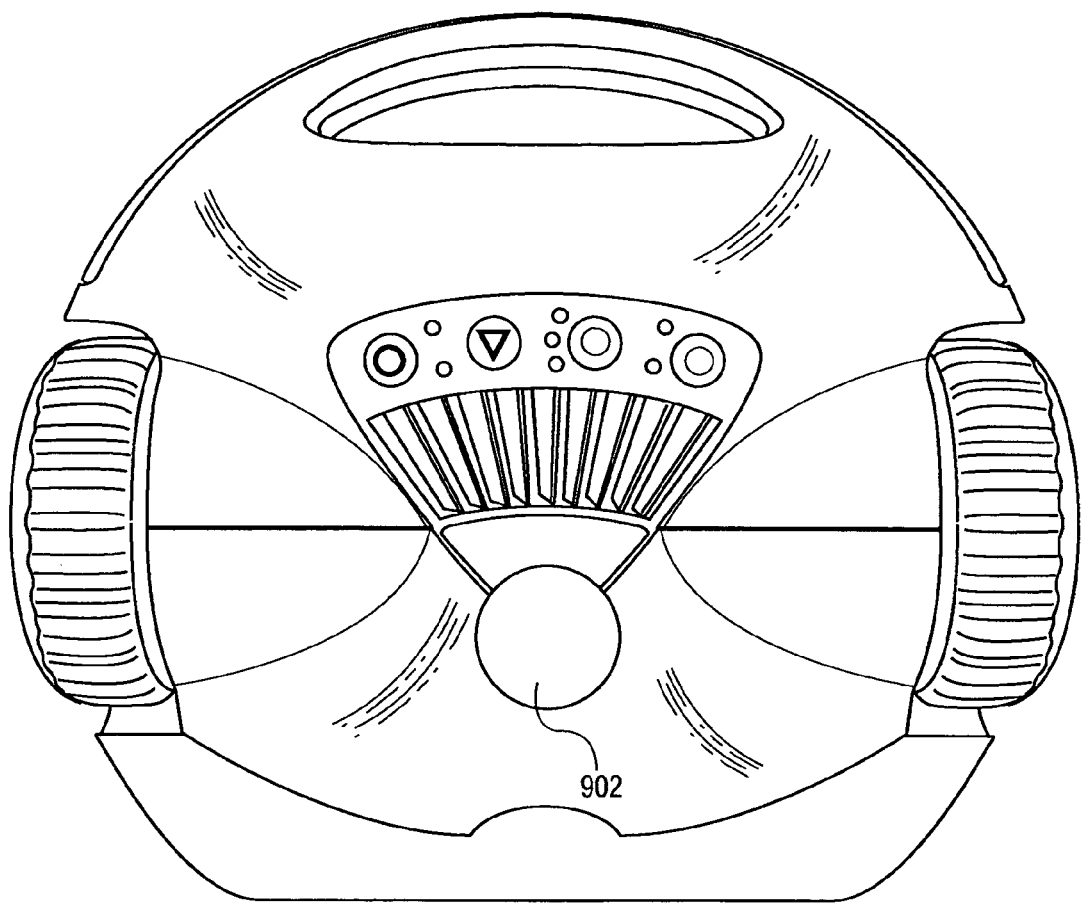
FIGS. 9A and 9B illustrate embodiments of connection port for use with a robot cleaner of one embodiment of the present invention.
Figure 9B:
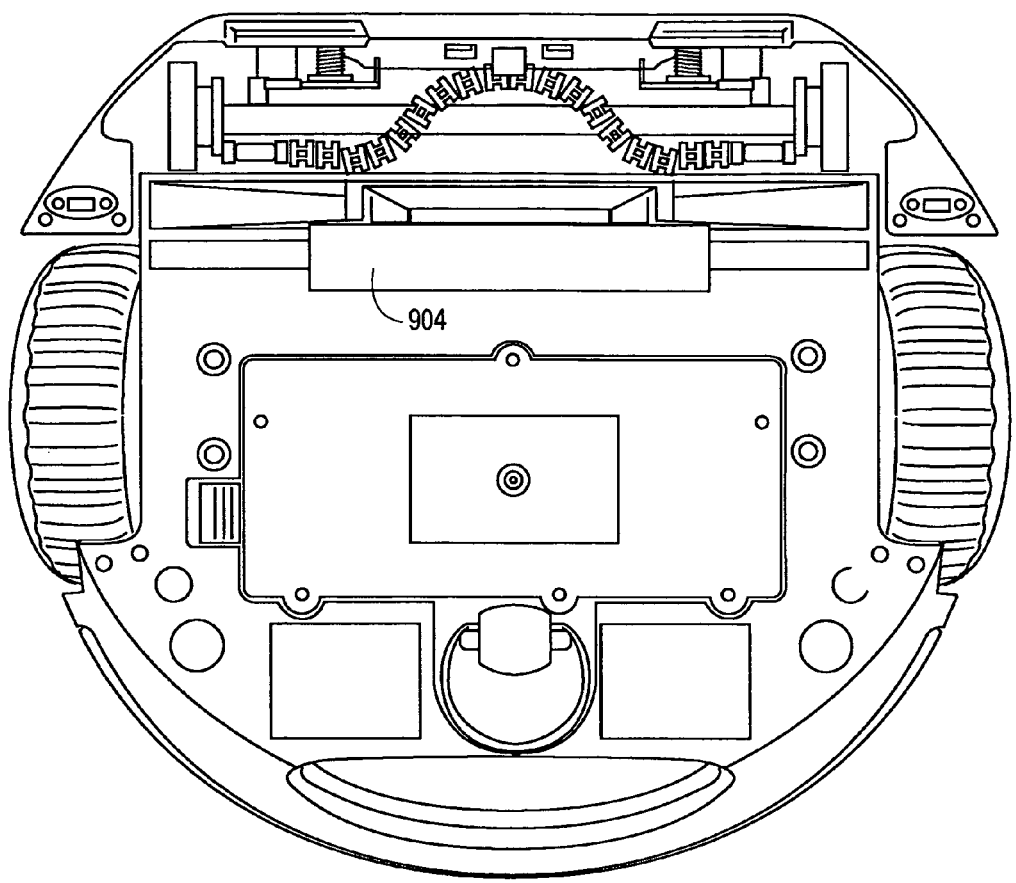
Figure 9C:
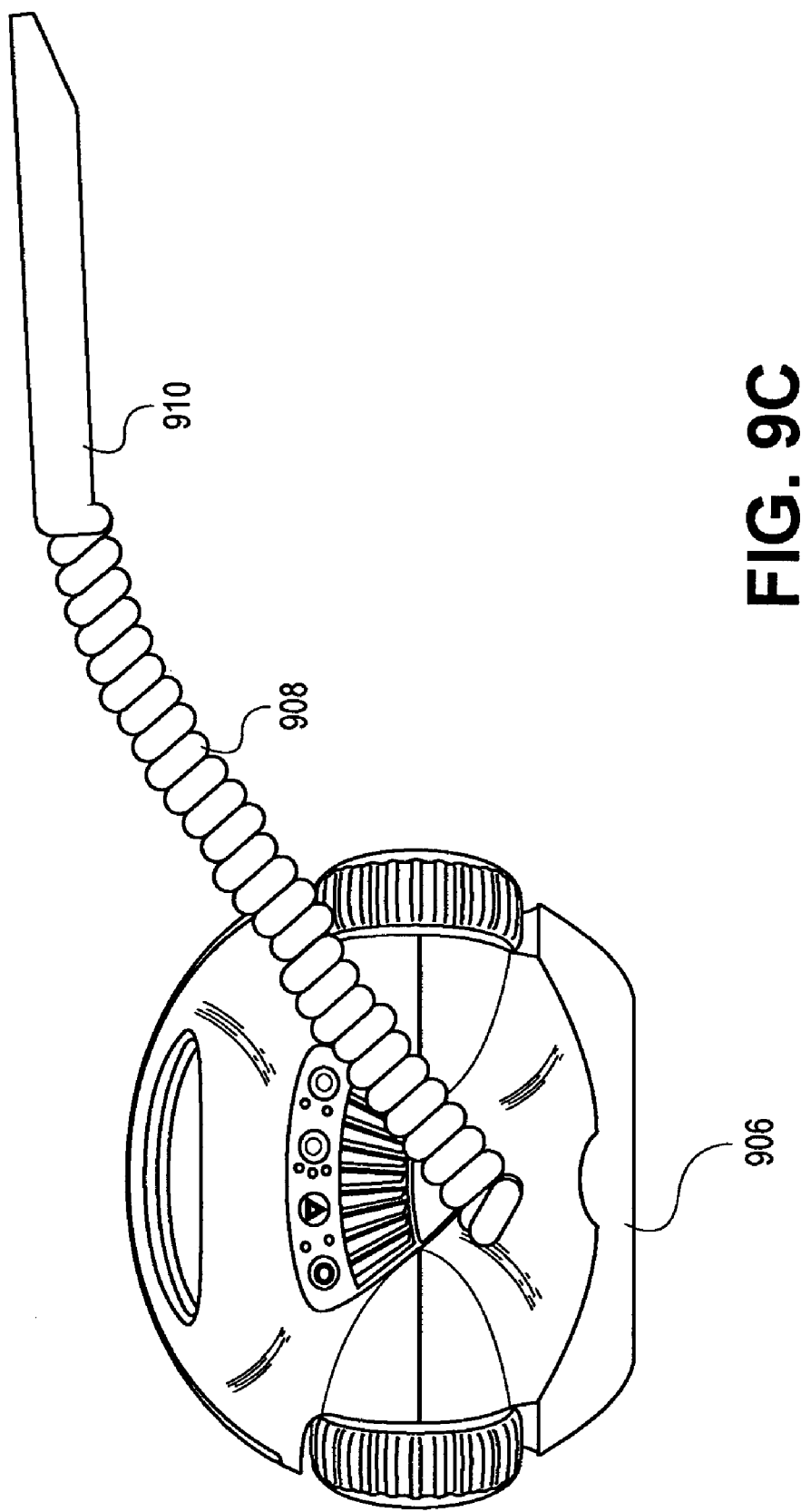
FIG. 9C illustrates an embodiment of a robot vacuum with an attached hose and crevice tool.

The supplemental cleaning element can connect to a connection port. FIG. 9A illustrates a connection port 902 on the top of the robot cleaner. FIG. 9B illustrates a connection port 904 on the bottom of the robot cleaner adjacent to the normal mode vacuum inlet. Connecting the supplemental cleaning element to the connection port can result in the normal mode vacuum inlet being mechanically or electromechanically closed. A part of the supplemental cleaning element or connection port can close off the normal mode vacuum inlet. Alternately, the supplemental cleaning element can cover the normal mode vacuum inlet on the bottom of the robot cleaner.

As shown in FIG. 1, the robot cleaner can have a handle, such as handle 160 of FIG. 1, for holding the robot cleaner while cleaning with the supplemental cleaning unit. In the example of FIG. 1, the handle 160 is part of the edge of the robot cleaner.

he supplemental cleaning element can include a hose attachment, a tube, a brush, a nozzle, a crevice tool and other elements. The use of both the robot cleaning mode increases the flexibility and usability of the device.

Other sensors 112 can also be used for obstacle detection. These other sensors 112 can include ultrasonic sensors, infrared (IR) sensors, laser ranging sensors and/or camera-based sensors. The other sensors can be used instead of, or as a complement to, the front bumper sensors.

In one embodiment, the robot cleaner 100 is able to detect an entangled condition. The processor can monitor the robot cleaner to detect the entangled condition and then adjust the operation of the robot cleaner to remove the entangled condition. Robot cleaners can become entangled at the sweeper or drive wheels 120 and 122. The entangled condition may be caused by a rug, string or other objects in a room.

In the example of FIG. 1, motor 120 drives the sweeper 114 and motors 124 and 126 drive the wheels 120 and 122. The motors driving the wheels and sweeper will tend to draw a larger amount or spike in the current when the motor shaft is stalled or stopped. A back electromotive force (EMF) is created when the motor is turned by an applied voltage. The back EMF reduces the voltage seen by the motor and thus reduces the current drawn. When a rise or spike in the current is sensed at the motor, the stall in the drive wheel, and thus the entanglement condition, can be determined.

The entangled condition can be determined in other ways, as well. In one embodiment, a lack of forward progress of the robot cleaner is used to detect the entangled condition. For example, when the robot cleaner is being driven forward but the position does not change and there are no obstacles detected by the sensors, an entangled condition may be assumed. The detection of the entangled condition can use the position tracking software module described below.

In one embodiment, the current drawn by a motor of the robot cleaner is monitored using a pin of a motor driver chip. The motor driver chip may include a pin that supplies a current proportional to the current through the motor. This current can be converted into a voltage by the use of a resistor or other means. This voltage can be converted in an analog-to-digital (A/D) converter and input to the processor 104. An example of a motor diver chip that includes such a current pin is the LM120H-Bridge motor diver chip. Other means to sense a current through the motor can alternately be used.

In one embodiment, when an entangled condition is sensed, the processor adjusts the operation of the robot cleaner to remove the entangled condition. For example, the power to the sweeper can be turned off and/or the robot cleaner 100 can be moved backward to remove the entangled condition. Alternately, the direction of the sweeper can be reversed. Once the entangled condition is removed, the operation of the robot cleaner 100 can proceed. If one or more entanglements occur at a location, an obstacle can be mapped for that location and that location can be avoided.

In one embodiment, sensors are used to detect the position of the robot cleaner. In the example of FIG. 1, sensors associated with wheels 120 and 122 can be used to determine the position of the robot. The sensors can sense the revolution of the wheels. Each unit of revolution corresponds to a linear distance that the treads of wheels 120 and 122 have traveled. This information can be used to determine the location and orientation of the robot cleaner. In an alternate embodiment, separate encoder wheels are used.

In one embodiment, optical quadrature encoders are used to track the position and rotation of the wheels 120 and 122 and thus give information related to the position of the robot cleaner 100.

In one embodiment, a particulate sensor 135 is used to detect the level of particulate cleaned or encountered by the robot cleaner 100. The operation of the robot cleaner 100 can be modified in response to a detected level of particulate. For example, in response to a high detected level of particulate, the robot cleaner can more thoroughly clean the current location. For example, the robot cleaner can slow down, back up or cause more overlap with previously cleaned regions or do a localized clean. When a low level of particulate is sensed, the current location may be cleaned less thoroughly. For example, the robot can be sped up or the overlap reduced.

In one example, the particulate sensor can be optical detector, such as photoelectric detector or a nephelometer, which detects the scattering of light off of particulate. In a photoelectric detector, such as those used in some smoke detectors, the light source and light sensor are positioned at 90-degree angles to one another. The light sensor may also be positioned in a chamber to reduce the ambient light. The detected level of scattered light is roughly proportional to the amount of particulate.

Alternately, a sound or vibration detector can sense the level of particulate cleaned by the robot cleaner. In one example, dirt contacts the sides of the vacuum as it is being acquired. More dirt causes greater noise and vibrations.

In one embodiment, a remote control unit is used. Signals from the remote control (not shown) received by remote control sensor 138 are decoded by processor 104 and used to control the operation of the robot cleaner 100.

The remote control can provide an indication concerning a room state to the robot cleaner. In an automatic cleaning mode, the processor can be used to direct the robot cleaner to clean the room. The processor uses the indication to set a cleaning pattern for the automatic cleaning mode. The room state indication can be an indication of cleaning time, on/off state, hard/soft surface clean, room size, room dirtiness or other indications. In one example, the cleaning time can be selected from the values: 15 minutes, 30 minutes and max life. The hard/soft surface clean indicates whether the surface is carpeted or uncarpeted, for example a hard surface clean can use a reduced speed sweeper operation. In one embodiment, a clean/dirty indication is used to set an overlap in the cleaning pattern. For example, it may be useful to have more overlap for a dirty room.

In one example, the remote control is used to select between an automatic control mode and a user control mode. In the automatic control mode, the processor of the robot directs the robot cleaner while the robot cleaner cleans. In the user control mode, commands from the remote control are used to direct the robot cleaner. The robot cleaner can keep track of its position so that when the robot cleaner returns to the automatic control mode the robot cleaner is able to resume cleaning.

In the example of FIG. 1, the robot cleaner 100 includes a battery 141 which is used to power the operation of the cleaning unit 110, the motors 124 and 126, the processor 104 and any other element that requires power. Battery management unit 142 under control of the processor 104 controls the supply of power to the elements of the robot cleaner 100. In one embodiment, the robot cleaner 100 can be put into a reduced power mode. In one example, the reduced power mode involves turning all or parts of the cleaning unit 102 off. For example, the vacuum and/or the sweeper can be turned off in the reduced power mode. Alternately, the cleaning unit can be put into a mode that uses less power. The processor 104 can automatically put the robot cleaner in a reduced power mode when the processor 104 determines that the robot cleaner 110 is in a region that has been cleaned. Indications of the cleaned regions can be stored in an internal map. The internal map can be used to determine the cleaned regions for setting the reduced power mode. A description of an internal map constructed by the robot cleaner 110 is given below. Power management using the reduced power mode can save battery life.

Using indications of the cleaned regions within a room, such as using an internal map, can also allow the robot cleaner 110 to avoid randomly re-cleaning regions of a room. This also reduces the cleaning time. If the power consumption is kept low using such techniques, an inexpensive battery or a more effective but energy-hungry cleaning unit can be used.

In one embodiment, the robot cleaner 100 has a user input element 104 on the case of the robot cleaner 110. The user input element 104 allows for the user to input the size of the room, room clutter, the dirt level, or other indications concerning the room. As discussed above, the size of the room can affect the operation of the robot cleaner.

In one embodiment, additional positioning sensors (not shown) are used as an alternate or supplement to the wheel encoders for determining the position of the robot cleaner 100. These additional positioning sensors can include gyroscopes, compasses and global positioning system (GPS) based units.

Figure 2A:
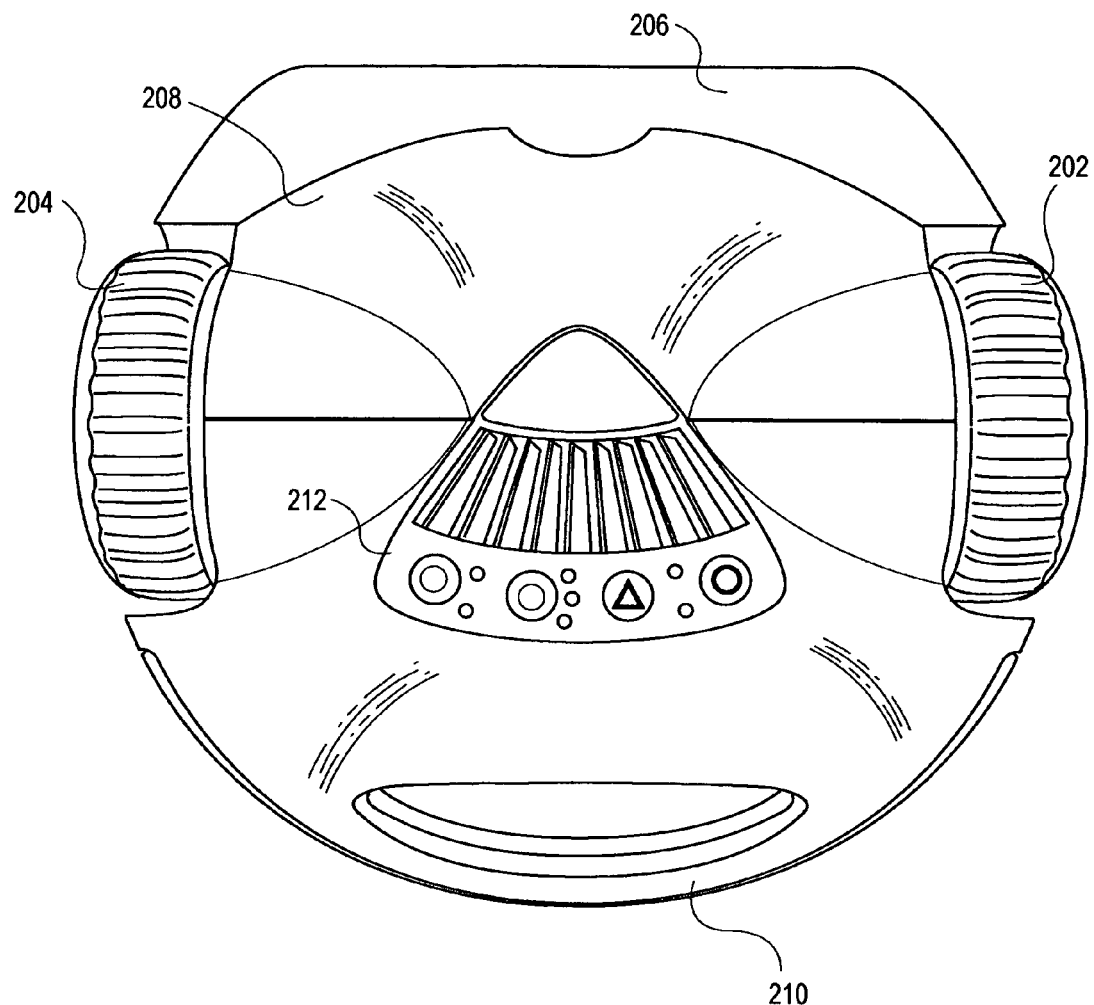
FIG. 2A is a top view of a robot cleaner of one embodiment of the present invention.
Figure 2B:
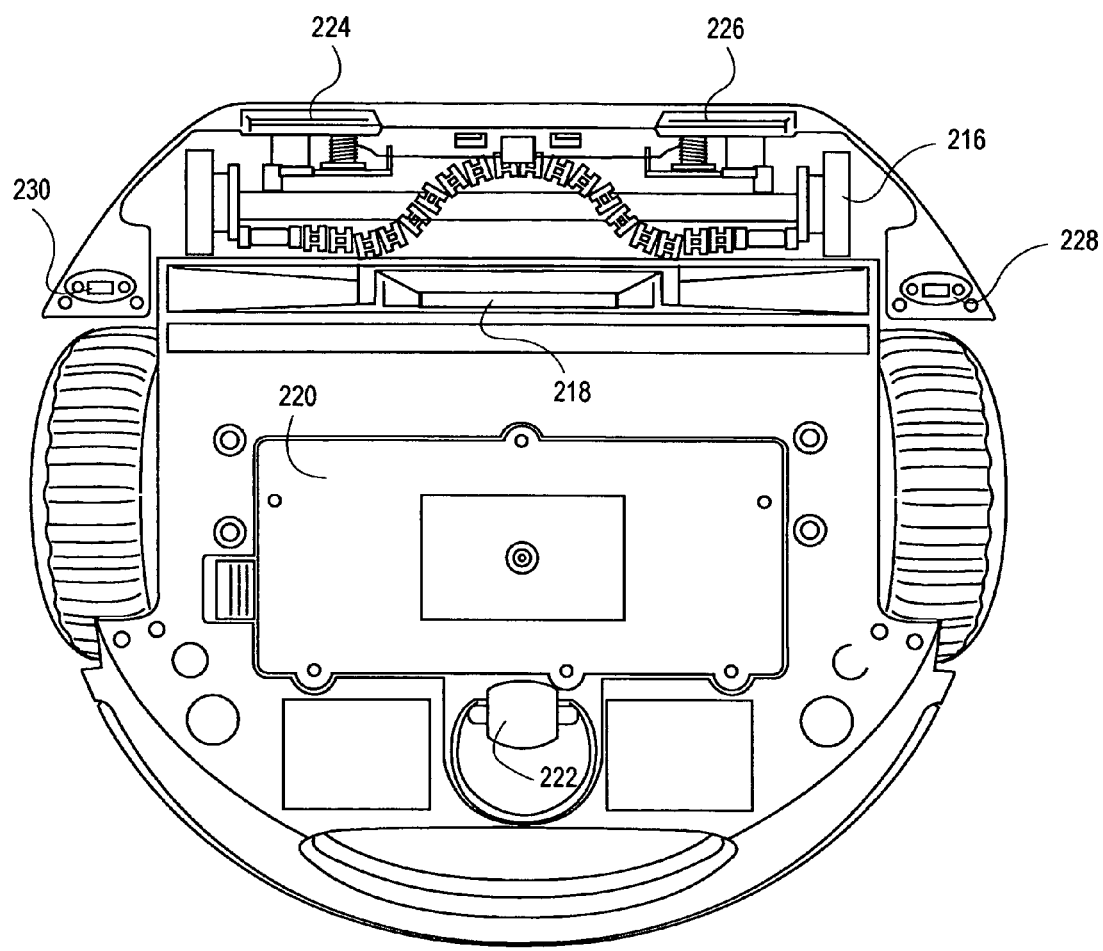
FIG. 2B is a bottom view of the robot cleaner of FIG. 2A.

FIG. 2A illustrates an illustration of the top view of the robot cleaner in one embodiment. Shown, in this embodiment are wheels 202 and 204, front bumper 206 which contains the bumper sensors, removable particulate section 208, a handle 210, and 212 input buttons with indicator lights. FIG. 2B illustrates the bottom of an exemplary robot cleaner. Shown in this view is sweeper 216, vacuum inlet 218, the battery compartment 220, bottom roller 222, bumper sensors 224 and 226, and edge detection sensors 228 and 230.

Figure 2C:
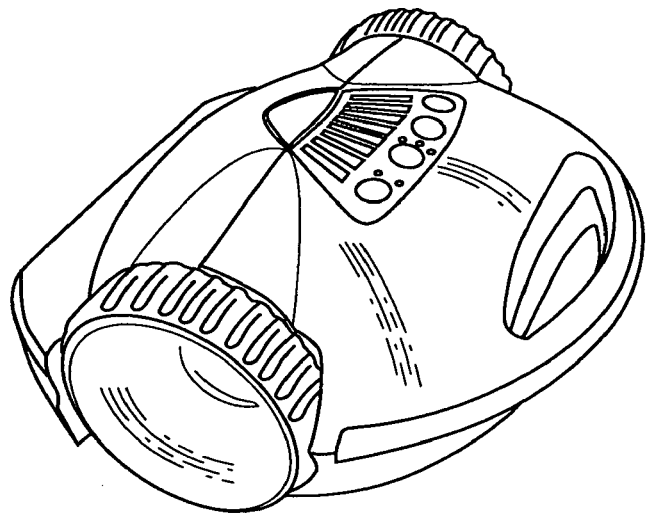
FIG. 2C is another top view of the robot cleaner of FIG. 2A.
Figure 2D:
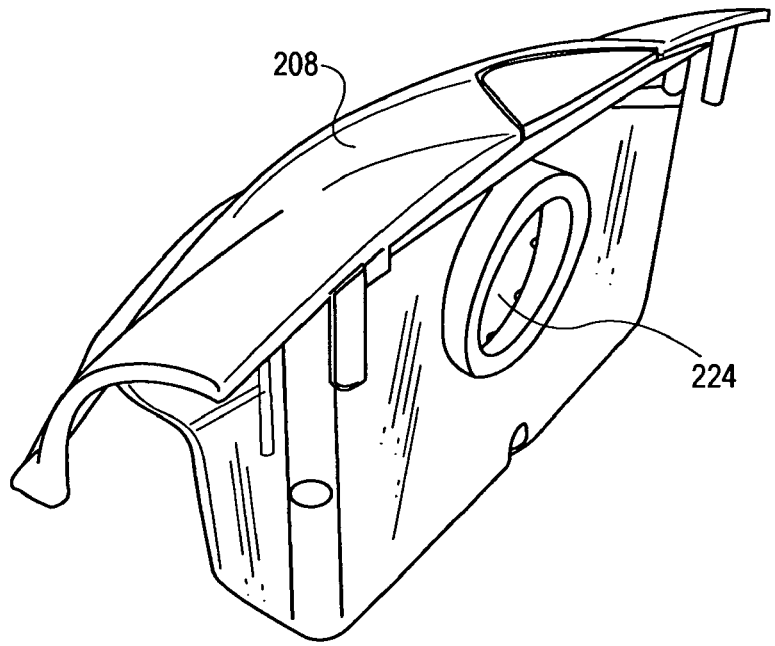
FIG. 2D is a view of a removable particulate storage unit of one embedment of the present invention.
Figure 2E:
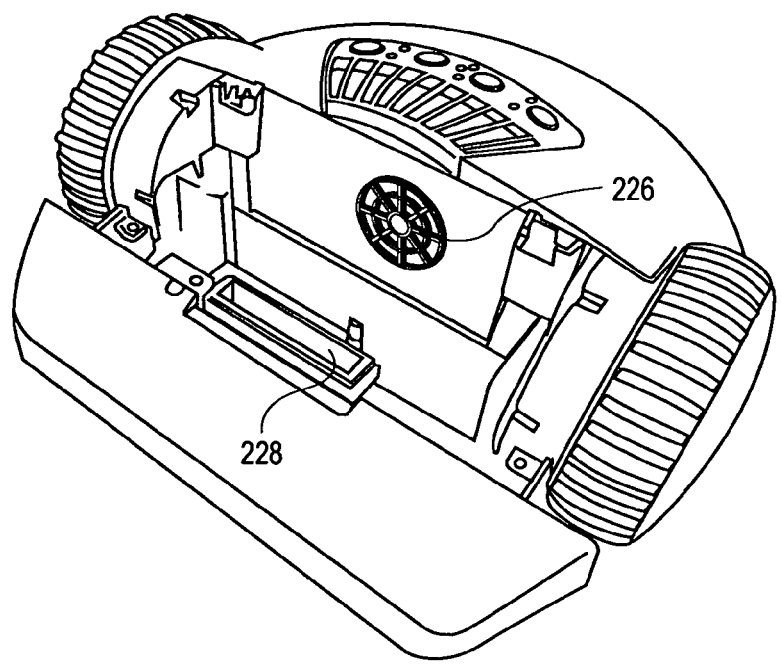
FIG. 2E is a view of a robot cleaner without the removable particulate storage unit.

FIG. 2C illustrates a perspective view of a robot cleaner. FIG. 2D illustrates the removable particulate section 208 with a port 224 for connecting to the vacuum. FIG. 2E illustrates the remainder of the robot vacuum with the particulate container 208 removed showing the outlet 226 to the vacuum fan and the inlet 228 to the bottom of the vacuum cleaner.

Figure 2F:
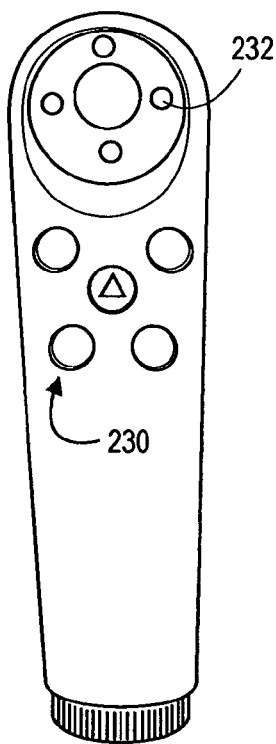
FIG. 2F illustrates a remote control of one embodiment of the present invention.

FIG. 2F illustrates a remote control including a number of control buttons 230 and a remote control wheel 232 for remotely steering the robot cleaner. In one embodiment, the signals from the remote control are transferred to a sensor on the robot cleaner to provide the information that the robot cleaner can use during its operations.

Figure 3:
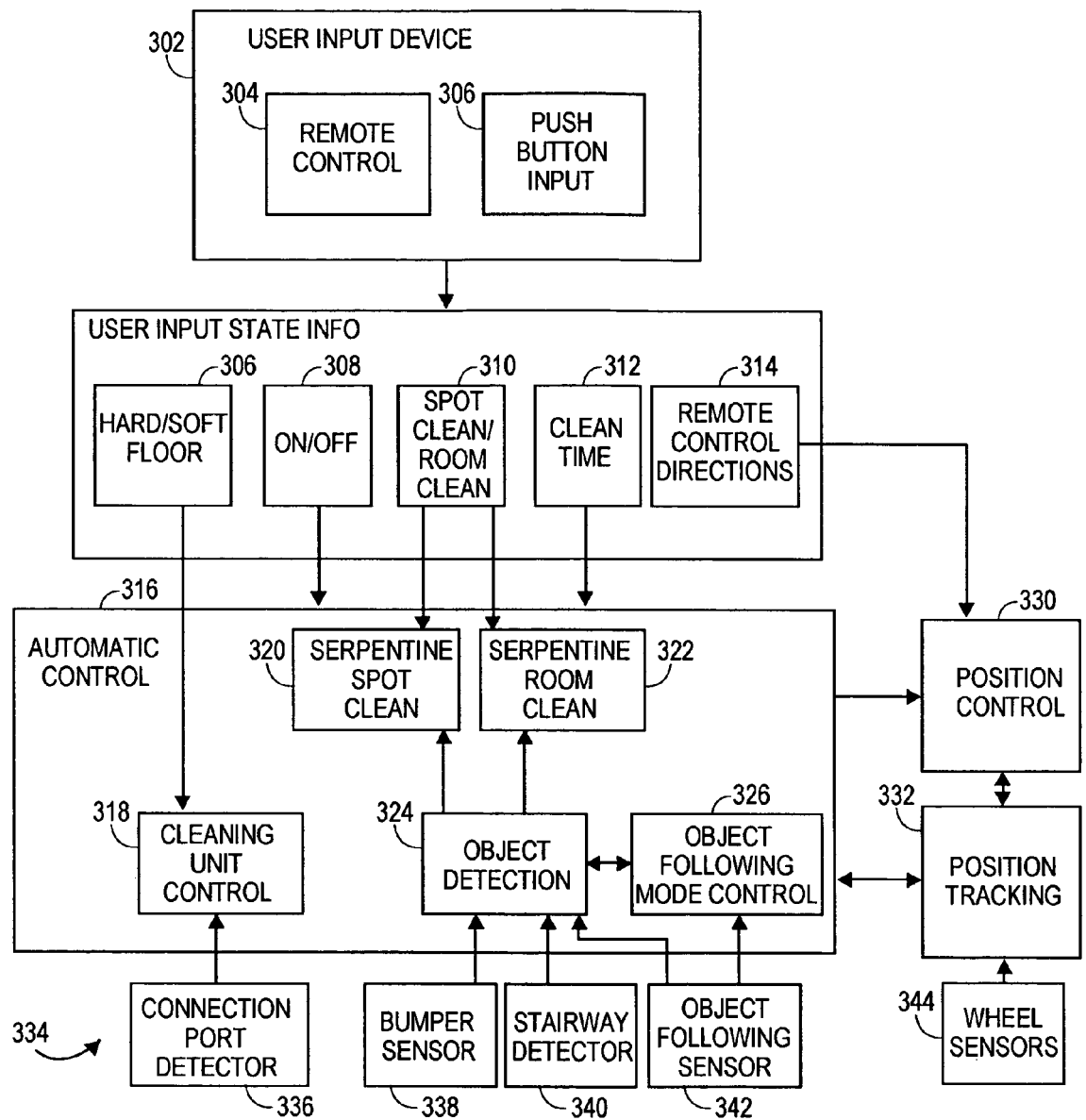
FIG. 3 is a diagram illustrating software modules of one embodiment of the present invention.

FIG. 3 illustrates control operations of the robot cleaner. A user input device 302 such as remote control 304 or push button input 306 on the top of the robot cleaner can be used to provide user state input 304. The user state input 304 can be stored along with other memory used by the robot cleaner, such as mapping information. In this example, the state information includes a hard/soft floor indication 306, an on/off indication 308, a localized clean room indication 310, a cleaning time indication 312 and remote control directions indication, 314. The hard/soft floor indication 306 can be used by cleaning unit control 318 to adjust the operation of sweep floor hard or soft floor. The cleaning unit control controls the operation of the sweeper and the vacuum. In one example, for a hard floor, the sweeper can be turned off or can be caused to revolve slower. The on and off indication 308 can be used to turn on or off the robot cleaner. Additionally, the on/off indication 308 can be used to pause the robot cleaner when the supplemental cleaning elements are used. The 310 is used to select between serpentine localized clean control 320 and the serpentine room clean control 322. The clean time information 310 is used to select the clean time, such as to select between a 15 minute clean, 30 minute clean or max life clean. The remote control direction indications 314 are provided to the position control 330. The position control 330 can be also controlled by the automatic control unit 316. The position control can also interact with the position tracking unit 332 which can include mapping functions. Position tracking can track the current position of the robot cleaner. Alternately, in one embodiment, limited or no position tracking can be used for some or all of the cleaning functions. In one embodiment the information for the position tracking unit 332 can be provided through the automatic control 316.

A number of sensors 334 can be used. These sensors can include the connection port detector 316 which can be used in one embodiment to detect whether the supplemental cleaning element is attached. In one embodiment, when the detector 316 detects that the supplemental cleaning element is attached, the sweeper can be automatically turned off. The bumper detector sensors 338, stairway detector sensors 340 and object following sensor 342 can provide input into the object detection module 324. The object detection module can provide information to the serpentine room clean module 322 and serpentine localized clean module 320. The object following sensors 342 can also provide a signal to the object following mode control unit 326 for operating the robot cleaner in an object falling mode.

Wheel sensors 344 can also be used to provide information for the position tracking 332. In one embodiment, this information is used for dead reckoning to add information for a room map or to provide information to find uncleaned regions of a room.

In one embodiment, the information from the wheel sensors can be obtained by a local position module in the position tracking unit 332. The local modules can then be called to provide update information to a global position module. The global position module can provide information used for the mapping of the cleaned areas.

The modules of FIG. 3 can be run on a processor or processors. In one embodiment, conventional operating systems are used due to the speed of a contemporary processors. An alternate embodiment, a real time operating system (RTOS) can be used. Real time operating system are operating systems that guarantees a certain capability within a specified time constraint. Real time operating systems are available from vendors such as Wind River Systems, Inc., of Alameda Calif.

One advantage of the serpentine pattern controlled by the modules 320 and 322 is that of ease of adaptation when obstacles are encountered. When obstacles, such as a descending stairway and objects such as furniture or wall is encountered, in any point of the pattern when the robot cleaner encounters the obstacle, the robot cleaner can back up and jump to the next direction of the pattern. When a robot cleaner get to an obstacle, the robot cleaner starts the next pass segment. This is shown in the examples of FIGS. 4 and 5.

It is possible that obstacle can result in uncleaned regions of a room. In one embodiment, the room is mapped by the robot cleaner and the location of unclean regions of the room are identified. The robot cleaner can proceed to move to the unclean regions and clean in another serpentine pattern within the unexplored area as shown in FIG. 5. Alternately, the serpentine cleaning can be done with another orientation.

For example, after a first serpentine clean with long north/south segments, a second serpentine clean with long left/right cleaning segments can be done. In this alternate embodiment, the robot cleaner does not need to keep track of the uncleaned regions of the room.

In one embodiment, the internal map used by the robot cleaner can mark cells as obstacle, cleaned or uncleaned. In one embodiment, a cell of the map can be cleaned with a single straight segment of a serpentine clean.

When the robot cleaner cleans regions of the room, indications of the cleaned regions can be stored. For example, the map is updated with indications that certain cells are cleaned. When the robot cleaner is in one the clean regions, the robot cleaner can be put into a reduced power mode to reduce battery power consumption. For example, the cleaning unit or portion of the cleaning unit can be turned off. In the example, FIG. 3 the cleaning unit control 318 can have access to an internal map and position information to determine when to put the robot cleaner in a reduced power mode.

Internal maps can allow the robot cleaner to insure that a particular location is not favored over more hidden locations. By applying a localization method, such as dead reckoning, a map of the environment can be built.

With an internal map, the robot cleaner can potentially preform path-planning routines that it would otherwise be able to do. The robot can be a lot smarter where to go next. The robot can also know what obstacles or walls to avoid because the robot has sensed them during earlier excursion. In one embodiment, the robot cleaner seeks out uncleaned regions. An algorithm can seek out areas of the map with the highest density of uncleaned cells. A software module can look for region with the lowest status and return to locations that the robot can go to for additional cleaning. This can insure that most of the area in the map are covered. In one embodiment, a minimum number of unclean cells in a region are required before the robot will move to that region. In one embodiment, the robot cleaner does path planning to get to specific locations. If there is no obstruction, the robot can go directly to the desired localized clean region. If there is an obstruction in the path, the internal map can be used to determine the path. For example, in one case, the robot cleaner uses an internal map to determine if there is an obstruction, a fixed distance, such as the one foot away from the robot cleaner in the direction of the point of interest. If there is no obstruction, as indicated by the internal map, the robot moves a fixed distance toward the goal to that location. If there is an obstruction marked, another path can be calculated by rotating a proposed path by a fixed number of degrees. If that path is free, the robot cleaner can use it, if not the proposed path is rotated another fixed increment and internal map checked again. If rotating the proposed path one way does not yield an open path, the robot can check for open paths the other direction. If during this technique the robot encounters new obstructions, the robot can back up and try the technique again.

An internal map for the robot cleaner can be store multiple rooms. In one embodiment, when a room is first cleaned stores the internal map for the room. When the robot cleaner robot cleaner goes to another room, the information from the first room is temporally maintained. If the robot vacuum goes to a third room, the memory could rewrite over the first room internal map to store an internal map for the third room. However, if the robot cleaner returns to the first room, without going into the third room, the information in the buffer can be used to navigate the first room. Sensors of the robot cleaner can be used to determine the connection points between the rooms to indicate to the robot cleaner the different rooms.

In an alternate embodiment, an object following mode can be used so that the use of the robot cleaner can follow along side of an object and avoid contacting it.

In one embodiment, no internal map needs to be stored. The operations of the serpentine localized clean and serpentine room clean can be done without storing the position information. Simple serpentine room cleans or multiple serpentine room cleans at different orientations can be done to clean the entire room without requiring an internal map. This can simplify the software and potentially cost of the robot cleaner.

In one embodiment, the map can store an internal map of less than a full room. In one embodiment, a map of a relatively small area around the robot cleaner is done. The internal map can keep track of objects, such as walls, in the area of the robot cleaner. The position of the robot cleaner can be maintained in the map so that objects can be avoided. In one embodiment, a short time period of data is stored. Old data can be removed from the internal map. Storing the map data for a short period ensures that the data does not become too stale. In one embodiment, data for a period of less than five minutes is stored. In one embodiment, data is stored for about 90 seconds. Alternately, data can be mantained for a specific distance from the robot cleaner. Data for regions outside this distance can be removed. Both of these internal mapping techniques, reduce the memory and processing requirements of the internal mapping.

Subgrid Cleaning Embodiment

One embodiment of the present invention uses subgrid based cleaning.

In one embodiment, the robot cleaner cleans subgrids which are regions of predetermined dimensions. A subgrid is typically smaller than a typical room size.

In one example, the robot cleaner determines a subgrid of predetermined dimensions within a room. In one example, the first subgrid starts at the position the robot cleaner is turned on. Alternately, the robot cleaner can orient the first subgrid along a wall or with the subgrid starting point in a corner of the room. In one embodiment, the robot cleaner cleans in a serpentine pattern within the subgrid. The robot cleaner then determines another subgrid of predetermined dimensions within the room to clean in a serpentine pattern.

In one embodiment, the robot cleaner determines a subgrid of predetermined dimensions the subgrid being a rectangular region longer and wider than the robot cleaner. The robot cleaner then cleans the subgrid. The robot cleaner then determines another subgrid of predetermined dimensions within the room to clean.

By using subgrids, the robot cleaner can use dead reckoning techniques for position control, without worrying about accumulating errors over the entire room. As the robot is switched to a new subgrid, the accumulated errors are eliminated.

Cleaning within a subgrid can be under the control of a subgrid cleaning control unit. The subgrid cleaning control unit can produce the destination points for a position control module.

Figure 11A:
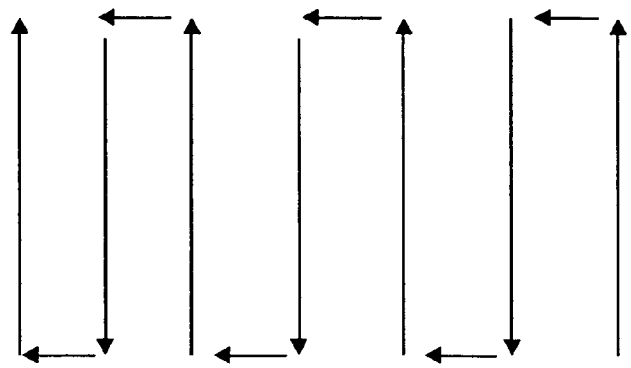
FIG. 11A is a diagram illustrating the path of a robot cleaner of one embodiment within a bubgrid.

FIGS. 11A-11D illustrate the cleaning of a subgrid. A basic pattern is used to maneuver the robot cleaner within the subgrid. In one embodiment, the basic pattern is the serpentine pattern shown in FIG. 11A. As shown in FIG. 11A, in one example the serpentine pattern includes straight line path segments. The robot cleaner can rotate in place in between straight line path segments. The straight line path segments can include parallel path segments that result in cleaning overlap.

In one example, the robot cleaner starts in the corner of the subgrid and moves forward until the vertical subgrid boundary in that direction is met. Then the robot cleaner turns 90 degrees to the left and advances a predetermined step left. The robot cleaner then turns left another 90 degrees and proceeds in a parallel fashion to the initial x boundary of the subgrid. Once the robot cleaner reaches the initial boundary it turns right 90 degrees and the pattern repeats. This process continues until the robot cleaner reaches a horizontal boundary of the subgrid. The serpentine pattern can start from any corner of the subgrid.

One advantage of the serpentine pattern is the ease of adaptation when obstacles are encountered. At any point in the pattern, when the robot cleaner encounters an obstacle, the robot cleaner can back up and jump to next direction in the pattern. When the robot cleaner gets to an obstacle, the robot cleaner starts the next path segment. This is shown in the example of FIG. 11B.

Figure 11B:
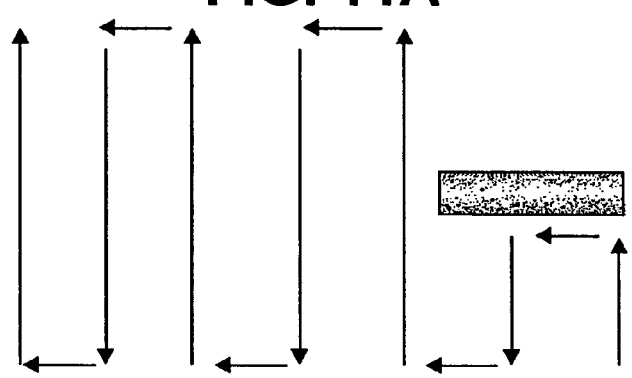
FIG. 11B is a diagram illustrating the path of the robot cleaner of one embodiment within a subgrid when there is an obstacle in the subgrid.
Figure 11C:
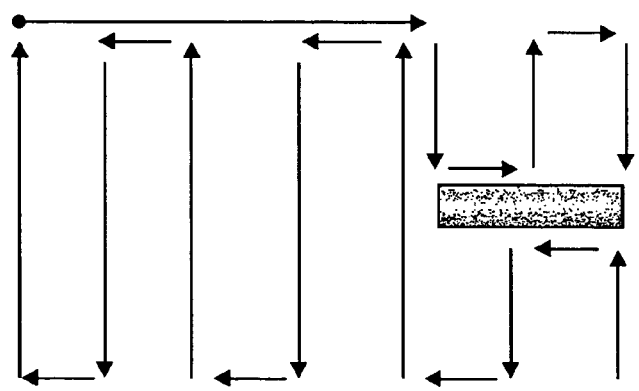
FIG. 11C is a diagram illustrating the path of a robot cleaner of one embodiment to clean previously unclean regions of the subgrid.

As shown in the example of FIG. 11B, obstacles can result in uncleaned regions of the subgrid. In one embodiment, the subgrid is mapped by the robot cleaner and the location of uncleaned regions in the subgrid is identified. The robot cleaner can proceed to move the uncleaned region and clean in another serpentine pattern within the unexplored area as shown in FIG. 11C.

Figure 11D:
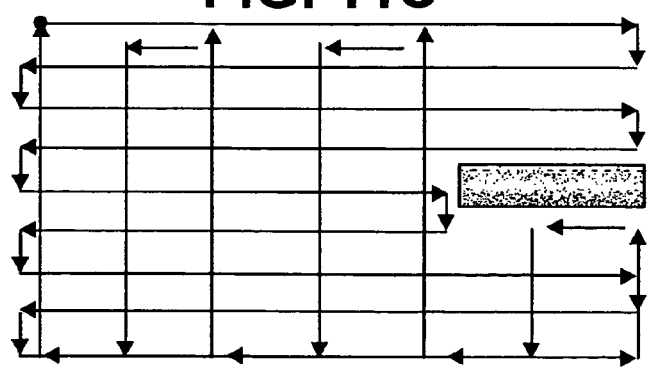
FIG. 11D is a diagram illustrating another example of the path of a robot cleaner of one embodiment to clean previously uncleaned regions of the subgrid.

Alternately, FIG. 11D illustrates a serpentine cleaning within the entire subgrid from another orientation. One advantage of the cleaning pattern of FIG. 11D is that the robot cleaner does not need to keep track of uncleaned regions in the subgrid. Serpentine patterns within the subgrid from additional orientations can also be done.

Figure 12A:
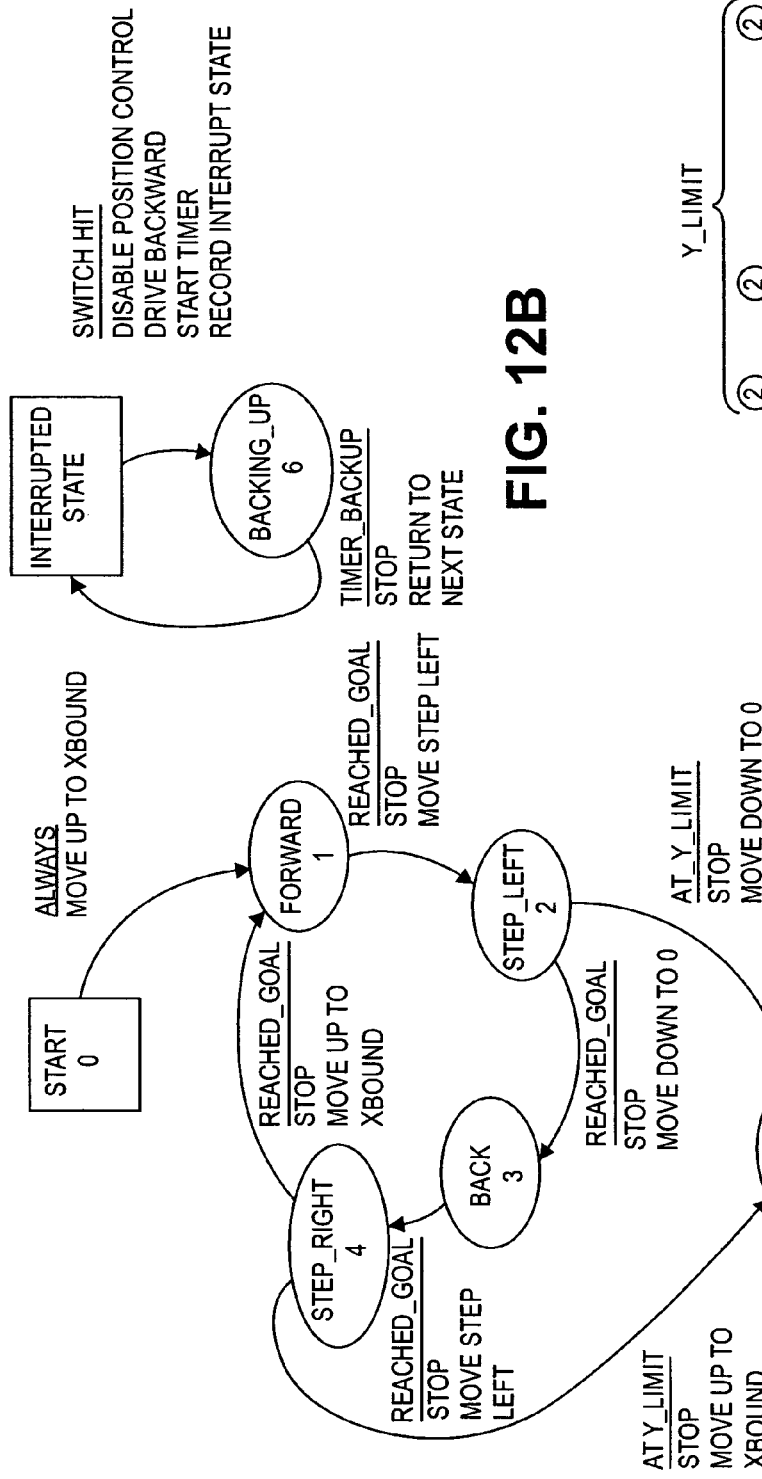
FIGS. 12A and 12B are diagrams of a state machine for the control of a robot cleaner of one embodiment of the present invention.
Figure 12B:
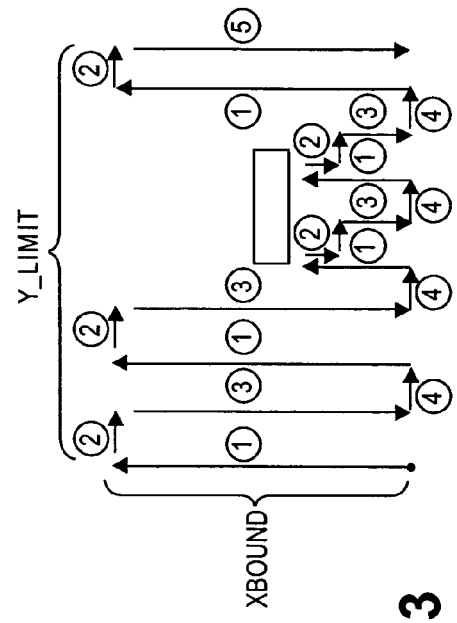

FIGS. 12A and 12B described below, describe a state machine for controlling the robot cleaner within a subgrid for one embodiment. In FIG. 12A, state 1 involves a cleaner motion up to the X_bound of the subgrid. State 2 involves a step motion at the top of the subgrid toward the Y_bound. State 3 involves a motion down to the X origin. State 4 involves a step motion at the bottom of the subgrid toward the Y_bound. State 5 involves a last pass that occurs when the Y_bound is reached. In FIG. 4B, state 6 is a backing up step that occurs when an obstacle is encountered. State 6 returns to the next state from the interrupted state. For example, if state 4 is interrupted, state 6 returns to state 1.

Figure 13:
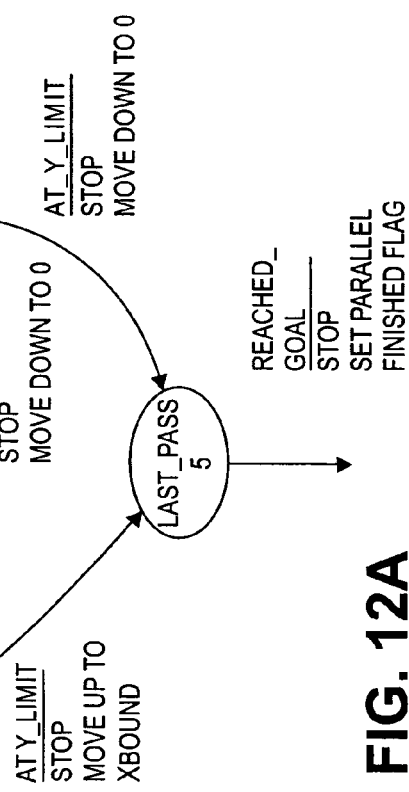
FIG. 13 is a diagram illustrating the operation of the robot cleaner following the state machine of FIGS. 12A and 12B.

FIG. 13 illustrates the states of the state machine for a path through the subgrid. By changing the X_bound and Y_bound, the state machine of FIGS. 13A and 13B can clean a different sized region. For example, the uncleaned region of a subgrid can be cleaned as shown in FIG. 11C by moving to a start position and setting the X_bound and Y_bound to the size of the uncleaned region.

A back-up control module can used for backing-up the robot cleaner once an obstacle encountered. A Subgrid cleaning control module 328 can also produce a local map of the subgrid for use in the cleaning of the subgrid. The local map information can be transferred to the room mapping unit to produce a room map. The room map can be at a lower resolution than the subgrid map to save memory and processing power. For example, a cell size of four inches by four inches may be used for the subgrid map while the room map uses a cell size of a foot by a foot.

Figure 14:
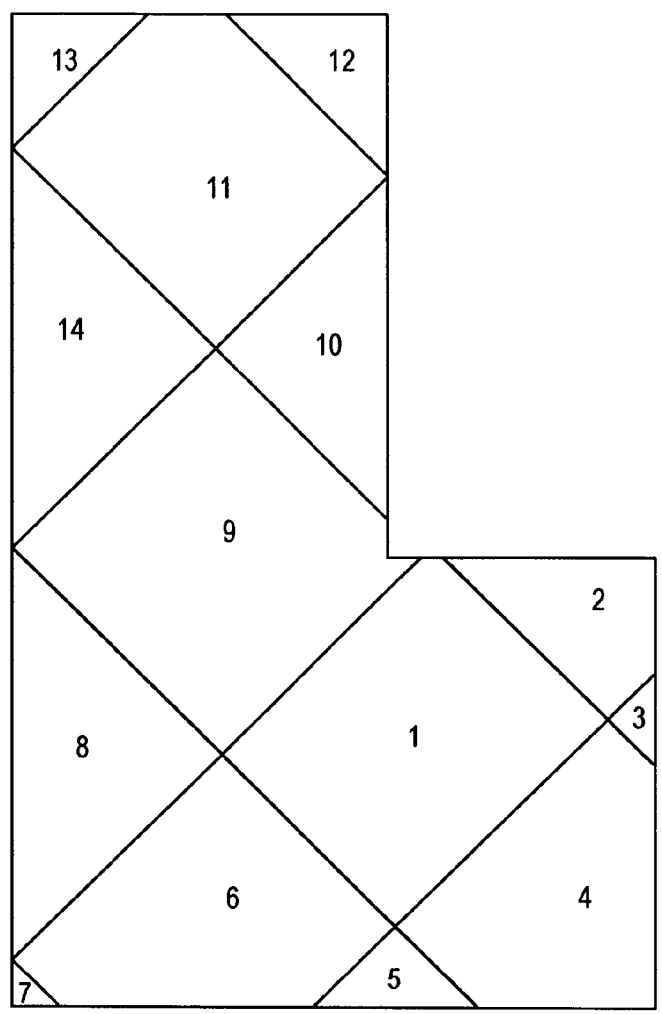
FIG. 14 is a diagram illustrating subgrids within a room.

The selection of the next subgrid can be under the control of a next subgrid selection module. The subgrid selection module can use the room map provided by the subgrid mapping unit module to select the next subgrid. In one embodiment, the next subgrid is selected to "bunch" together the cleaned subgrids rather than having the subgrids form a straight line across a room. FIG. 14 illustrates the selection of subgrids within a room. In this embodiment, the next subgrid selected is adjacent to a previous subgrid. In the example of FIG. 14, the subgrids are selected in a roughly spiral shape to bunch together the subgrids.

Figure 15:
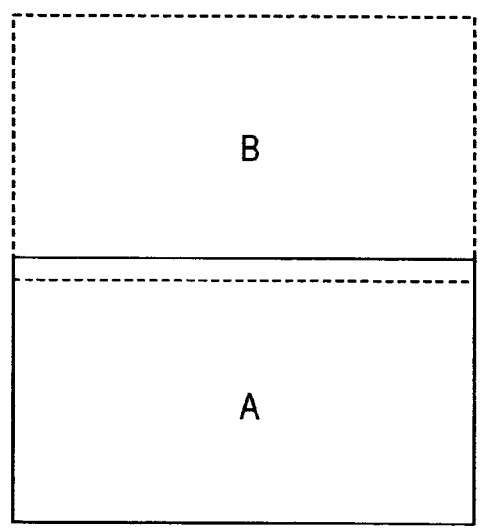
FIG. 15 is a diagram illustrating overlap in subgrids of one embodiment in the present invention.

FIG. 15 illustrates the use of overlap between subgrids. In the example of FIG. 15, subgrid B overlaps subgrid A. The use of overlap between subgrids prevents accumulated errors in the positioning system from causing the subgrids to be misaligned with uncleaned regions between subgrids.

In one embodiment, a cell and subgrid size selection module selects the size of the cleaning cell and the subgrid. The subgrid size can be modified for different sized rooms. For example, a large size room may use relatively large subgrids. The size of the cell can be dictated by the dirtiness of the room. Smaller cells result in more overlap in cleaning unit width and thus in a more thorough cleaning of the room.

Figures 16A, 16B:
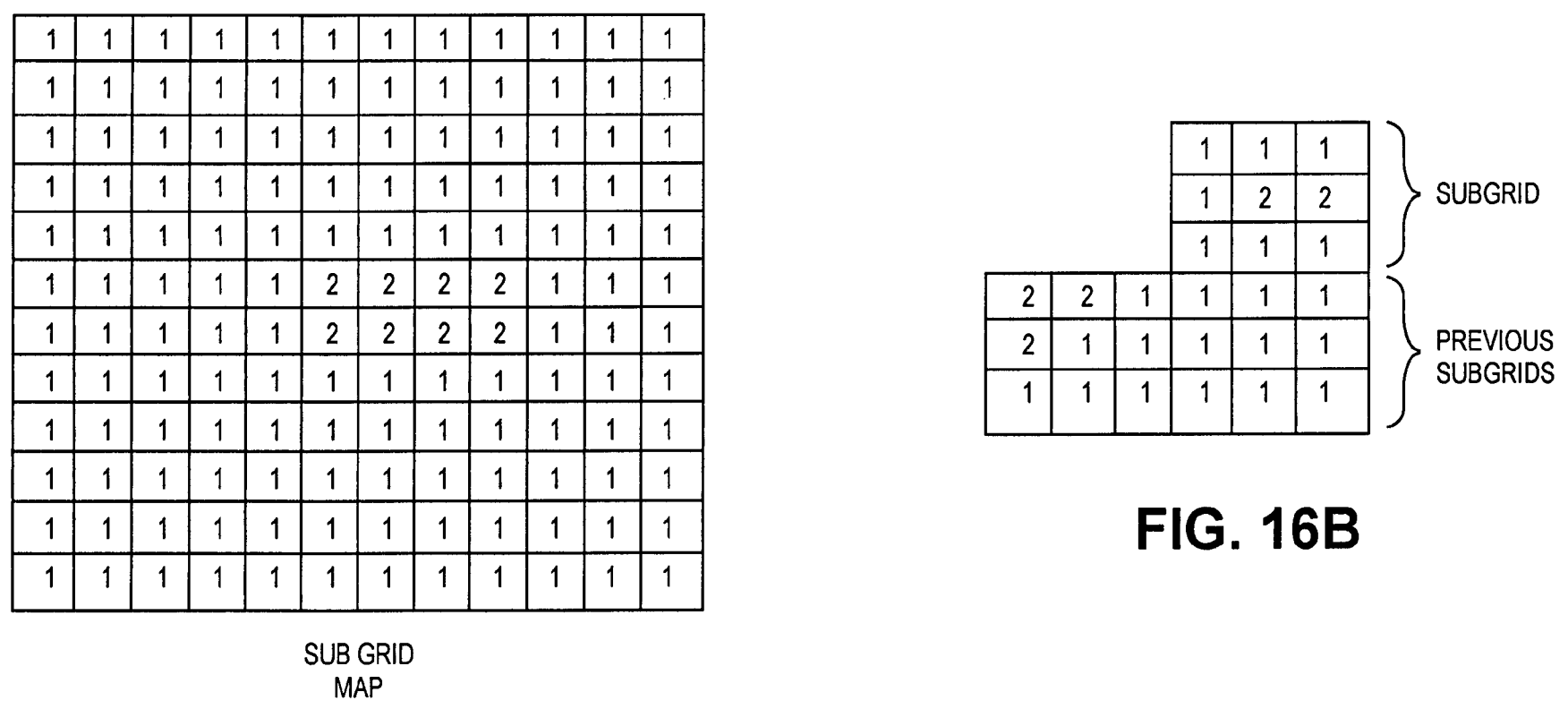

In one embodiment, a region in a room is cleaned with a robot cleaner. The region is mapped in a first internal map. Information from the first internal map is used to produce a second internal map of lower resolution. The internal maps can be data structures used by the robot cleaner. In one example, the first internal map is sub a grid map and the second internal map is a room map. FIG. 16A shows an example of a sub grid map with the obstacle indicated with cells marked with "2". FIG. 16B shows an example of a room map. The lower resolution for the room map conserves on memory and processing. The internal maps can be composed of cells. In one example, the cells are marked as obstacle, cleaned or uncleaned. A width of a cell of a subgrid map may correspond to portion of the effective cleaning unit width of the robot cleaner. In one embodiment, a cell of the subgrid map can be set cleaned with single straight line path segment of robot cleaner. Information of the first internal map, such as the subgrid map can be cleared after the region is cleaned. A new internal map can be prepared for the next region being cleaned.

In one embodiment, when the robot cleaner cleans regions of the room, indications of the cleaned regions are stored. For example, the maps are updated with indications that certain cells are cleaned. When the robot cleaner is in one of the cleaned regions, the robot cleaner can be put into a reduced power mode to reduce battery power consumption. For example, the cleaning unit or a portion of the cleaning unit can be turned off. A reduced power mode module can have access to internal map and position information to determine when to put the robot cleaner in the reduced power mode.

Internal environment maps can allow the robot cleaner to ensure that a particular location is not favored over a more "hidden" location giving all open locations equal attention. By applying a localization method, such as dead reckoning, a map of the environment of the robot can be built.

With an internal map, such as the room or subgrid maps, the robot cleaner can potentially perform path-planning routines that it otherwise would not be able to do. The robot can be a lot "smarter" about where to go next. The robot can also know what to avoid (obstacles or walls) because the robot has sensed them during earlier excursions.

The maps can be produced through the modeling of information gathered from the sensory systems of the robot. In one embodiment, a room map initially is created with a defined map size and map resolution.

In on embodiment, each cell holds three values: X_val, Y_val, and STATUS. X_val and Y_val denote values that are length units used outside of the mapping routines (such as feet or inches). STATUS holds the value denoting the status of the cell, whether the robot has been there (denoted by value of 1 in our case, or 2 for an obstruction). These values are arbitrarily but have been chosen in order to be useful later when algorithms are used to determine what parts of the map the robot should avoid, i.e., when an area has a high average value/density of high numbers (that denote obstacles), or when an area has a high average value/density of zeros (denoting that space should be explored).

The position given by the localization technique is modeled to be close to the center of the robot. The robot cleaner is modeled as a space, such as a 12" by 12" space, in the internal environment map. This simplifies some of the code required to model the robot. The drawback to this simplification is that, according to the map, the robot appears to be covering more ground than it really is 12"-by-12" is an exaggeration of the robot cleaner size.

A tactile switch when asserted, will mark a point on the map that corresponds with the location of the switch. Each switch can be uniquely marked on the map, as opposed to a single unidentifiable mark. Additional sensors such as IR or sonar can mark the map in a similar fashion. The cell locations for updating the map can be obtained using the absolute frame x and y values of the center of the robot cleaner along with any offset for sensor location.

In one embodiment, the robot cleaner seeks out uncleaned regions. Ideally, an algorithm seeks out areas with the highest density of uncleaned cells. A software module can look for a region with the lowest average status and returns a location that the robot cleaner can go to for additional cleaning. This ensures that most of the areas in the map are covered. In one embodiment, a minimum number of zeroes in a region is required before requiring the robot to move to that region.

In one embodiment, the robot cleaner does path planning to get to specific locations. If there is no obstruction, the robot can go directly to the desired spot. If there is an obstruction in the path the internal map can be used to determine the path. For example, in one case, the robot cleaner uses an internal map to determine if there is an obstruction, a fixed distance, such as 1 ft, away from the robot cleaner in the direction of the point of interest. If there is no obstruction, as indicated by the internal map, the robot moves the fixed distance toward the goal to that location. If there is an obstruction marked in the internal map, another path is calculated by rotating the proposed path left 5°. If that path is free, the robot cleaner uses it, if not, the proposed path is rotated left another 5° and the internal map is checked again. If rotating the proposed path left does not yield an open path, the robot can check for open paths on the right. If, during this technique, the robot encounters new obstructions, they are marked on the map, the robot backs up, and tries the technique again.

The foregoing description of the preferred embodiments of the present invention has been provided for the purposes of illustration and description. It is not intended to be exhaustive or to limit the invention to the precise forms disclosed. Many modifications and variations will be apparent to practitioners skilled in the art. The embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. A method of operating a robot cleaner comprising:
   (a) generating an internal map of an area comprising a plurality of subgrids, each subgrid comprising a plurality of cells;
   (b) generating a subgrid map for each subgrid of the internal map, wherein the subgrid map has a higher resolution than resolution of the internal map;
   (c) causing the robot cleaner to travel on a surface along a travel path from one subgrid to another subgrid in a spiral;
   (d) during the traveling in each subgrid:
      (i) gathering data corresponding to each traveled cell and each non-traveled cell of the subgrid;
      (ii) at least partially cleaning the traveled cells of the subgrid; and
      (iii) storing status data for each cell in the subgrid map;
   (e) determining which part of the subgrid map has a highest density of uncleaned cells;
   (f) using the subgrid map to calculate a travel path to the part of the subgrid that has a highest density of uncleaned cells;
   (g) using the subgrid map to determine if the travel path is free from obstructions; and
   (h) if path is obstructed, rotating the travel path by a predetermined number of degrees and repeating steps (f)-(g); and
   (i) if path is not obstructed, repeating steps (c)-(h).

2. The method of claim 1, wherein each subgrid is cleaned in a serpentine clean.

3. The method of claim 1, wherein generating an internal map comprises generating the internal map using dead reckoning.

4. The method of claim 1, wherein wherein status data includes at least cleaned, uncleaned or obstruction.

5. The method of claim 1, wherein a width of a cell corresponds to portion of effective cleaning unit width of the robot cleaner.

6. The method of claim 1, wherein a cell can be set cleaned with a single straight line path segment of robot cleaner.

7. The method of claim 1, wherein the internal map is a room map.

8. The method of claim 1, wherein generating an internal map comprises selecting subgrid sizes and generating a subgrid map comprises selecting cell sizes.

9. The method of claim 1, wherein information in the subgrid map is cleared after the subgrid is cleaned.

10. The method of claim 1, wherein a new subgrid map is prepared for a next subgrid being cleaned.

11. A robot cleaner comprising:
   a body including a cleaning unit;
   at least one wheel coupled to the body;
   at least one motor operatively coupled to the at least one wheel;
   at least one processor operatively coupled to the at least one motor;
   at least one input device operatively coupled to the at least one processor;
   at least one sensor operatively coupled to the at least one processor; and
   at least one memory device storing a plurality of instructions which are executable by the at least one processor to:
      (a) generate an internal map of an area comprising a plurality of subgrids, each subgrid comprising a plurality of cells;
      (b) generate a subgrid map for each subgrid of the internal map, wherein the subgrid map has a higher resolution than resolution of the internal map:,
      (c) cause the at least one wheel to move thereby causing the body to travel on a surface along a travel path from one subgrid to another subgrid in a spiral;

(d) during the traveling in each subgrid:
- (i) gather data corresponding to each traveled cell and each non-traveled cell of the subgrid;
- (ii) at least partially clean the traveled cells of the subgrid; and
- (iii) store status data for each cell in the subgrid map;

(e) determine which part of the subgrid map has a highest density of uncleaned cells;

(f) use the subgrid map to calculate a travel path to the part of the subgrid map that has a highest density of uncleaned cells;

(g) use the subgrid map to determine if the travel path is free from obstructions; and (h) if a path is obstructed, rotate the travel path by a predetermined number of degrees and repeating steps (f)-(g); and (i) if a path is not obstructed, repeat steps (c)-(h).

12. The robot cleaner of claim 11, wherein each subgrid is cleaned in a serpentine clean.

13. The robot cleaner of claim 11, wherein generating an internal map comprises generating the internal map using dead reckoning.

14. The robot cleaner of claim 11, wherein status data includes at least cleaned, uncleaned or obstruction.

15. The robot cleaner of claim 11, wherein a width of a cell corresponds to a portion of effective cleaning unit width of the robot cleaner.

16. The robot cleaner of claim 11, wherein a cell can be set cleaned with a single straight line path segment of the robot cleaner.

17. The robot cleaner of claim 11, wherein the internal map is a room map.

18. The robot cleaner of claim 11, wherein generating an internal map comprises selecting subgrid sizes and generating a subgrid map comprises selecting cell sizes.

19. The robot cleaner of claim 11, wherein information in the subgrid map is cleared after the subgrid is cleaned.

20. The robot cleaner of claim 11, wherein a new subgrid map is prepared for a next subgrid being cleaned.

* * * * *